(12) United States Patent
Tokudome et al.

(10) Patent No.: US 10,744,495 B2
(45) Date of Patent: Aug. 18, 2020

(54) PHOTOCATALYST MATERIAL AND METHOD FOR PRODUCING SAME

(71) Applicants: TOTO LTD., Kitakyushu-shi, Fukuoka (JP); THE UNIVERSITY OF TOKYO, Bunkyo-ku, Tokyo (JP); Japan Technological Research Association of Artificial Photosynthesis Chemical Process, Chiyoda-ku, Tokyo (JP)

(72) Inventors: Hiromasa Tokudome, Kitakyushu (JP); Sayuri Okunaka, Kitakyushu (JP); Kazunari Domen, Tokyo (JP); Takashi Hisatomi, Tokyo (JP); Qian Wang, Tokyo (JP); Qingxin Jia, Tokyo (JP)

(73) Assignees: Toto Ltd., Fukuoka (JP); The University of Tokyo, Tokyo (JP); Japan Technological Research Assocation of Artificial Photosynthesis Chemical Process, Tokyo (JP)

(*) Notice: Subject to any disclaimer, the term of this patent is extended or adjusted under 35 U.S.C. 154(b) by 397 days.

(21) Appl. No.: 15/745,085

(22) PCT Filed: Jul. 29, 2016

(86) PCT No.: PCT/JP2016/072355
§ 371 (c)(1),
(2) Date: Jan. 15, 2018

(87) PCT Pub. No.: WO2017/022671
PCT Pub. Date: Feb. 9, 2017

(65) Prior Publication Data
US 2018/0214858 A1    Aug. 2, 2018

(30) Foreign Application Priority Data

Jul. 31, 2015  (JP) ................................ 2015-151377
Jan. 8, 2016   (JP) ................................ 2016-002816

(51) Int. Cl.
*B01J 35/00* (2006.01)
*B01J 23/58* (2006.01)
(Continued)

(52) U.S. Cl.
CPC ............. *B01J 35/004* (2013.01); *B01J 23/31* (2013.01); *B01J 23/58* (2013.01); *B01J 23/62* (2013.01);
(Continued)

(58) Field of Classification Search
CPC . B01J 35/004; B01J 23/31; B01J 23/58; B01J 23/62; B01J 23/63; B01J 23/6484;
(Continued)

(56) References Cited

U.S. PATENT DOCUMENTS

2015/0251172 A1* 9/2015 Tokudome ............. B01J 21/063
                                                    428/323
2016/0346763 A1* 12/2016 Wahab ................... B01J 35/023
2017/0274364 A1* 9/2017 Idriss ....................... B01J 23/48

FOREIGN PATENT DOCUMENTS

WO   WO-2014046305 A1 *  3/2014  ............. B01J 23/30

* cited by examiner

*Primary Examiner* — Patricia L. Hailey
*Assistant Examiner* — Michael Forrest
(74) *Attorney, Agent, or Firm* — Carrier Blackman & Associates, P.C.; Joseph P. Carrier; William D. Blackman

(57) ABSTRACT

A photocatalytic member comprises a base and a photocatalytic layer fixed on the base. The photocatalytic layer comprises first photocatalyst particles being visible light responsive photocatalyst particles for hydrogen generation, second photocatalyst particles being visible light responsive photocatalyst particles for oxygen generation, and conductive particles which are provided between the first photocatalyst particle and the second photocatalyst particle, have Fermi level at a negative position relative to an electronic energy level at the upper end of the valence band of the first (Continued)

photocatalyst particle and at a positive position relative to an electronic energy level at the bottom end of the conduction band of the second photocatalyst particle, and are able to store an electron and a hole. In the photocatalytic layer, the conductive particles are located to be coupled to both the first photocatalyst particles and the second photocatalyst particles.

20 Claims, 12 Drawing Sheets

(51) Int. Cl.
| | |
|---|---|
| *B01J 23/63* | (2006.01) |
| *B01J 23/847* | (2006.01) |
| *B01J 23/31* | (2006.01) |
| *B01J 23/78* | (2006.01) |
| *B01J 23/887* | (2006.01) |
| *B01J 37/03* | (2006.01) |
| *B01J 35/02* | (2006.01) |
| *B01J 23/652* | (2006.01) |
| *B01J 23/89* | (2006.01) |
| *B01J 27/24* | (2006.01) |
| *C01B 13/02* | (2006.01) |
| *B01J 23/62* | (2006.01) |
| *B01J 23/648* | (2006.01) |
| *B01J 23/86* | (2006.01) |
| *C01B 3/04* | (2006.01) |

(52) U.S. Cl.
CPC ........... *B01J 23/63* (2013.01); *B01J 23/6484* (2013.01); *B01J 23/6486* (2013.01); *B01J 23/6525* (2013.01); *B01J 23/78* (2013.01); *B01J 23/8472* (2013.01); *B01J 23/86* (2013.01); *B01J 23/8877* (2013.01); *B01J 23/898* (2013.01); *B01J 27/24* (2013.01); *B01J 35/002* (2013.01); *B01J 35/006* (2013.01); *B01J 35/0006* (2013.01); *B01J 35/02* (2013.01); *B01J 35/023* (2013.01); *B01J 37/031* (2013.01); *C01B 3/042* (2013.01); *C01B 13/0207* (2013.01); *B01J 2523/00* (2013.01); *Y02E 60/364* (2013.01)

(58) Field of Classification Search
CPC .... B01J 23/6486; B01J 23/23; B01J 23/6525; B01J 23/78; B01J 23/8472; B01J 23/86; B01J 23/8877; B01J 23/898; B01J 27/24; B01J 35/0006; B01J 35/35; B01J 35/002; B01J 35/006; B01J 35/02; B01J 35/023; B01J 37/031; C01B 3/042; C01B 13/0207
See application file for complete search history.

PHOTOCATALYST MATERIAL AND METHOD FOR PRODUCING SAME

FIELD OF INVENTION

The present invention relates to a photocatalytic member comprising a photocatalytic layer fixed on a base, the photocatalytic layer containing photocatalyst particles for hydrogen generation and photocatalyst particles for oxygen generation, which can split water using visible light, and also relates to a method for producing the member.

BACKGROUND ART

Visible light responsive photocatalysts can utilize visible light which accounts for large part of sunlight. The visible light responsive photocatalysts are expected to be applied for photodecomposition of organic substances and hydrogen production by splitting water. In particular, photocatalysts for the purpose of splitting water to produce hydrogen have received attention as photocatalysts usable for hydrogen generating process with the renewable energy. As a result, demand for highly active photocatalysts for splitting water has increased.

WO 2014/046305 A (PTL 1) discloses as an example a photocatalytic member comprising a base and a photocatalytic layer fixed thereon, the photocatalytic layer containing visible light responsive photocatalyst particles for hydrogen generation having a primary particle diameter of 100 nm or less; and visible light responsive photocatalyst particles for oxygen generation. In this example, the visible light responsive photocatalyst particles for hydrogen generation and the visible light responsive photocatalyst particles for oxygen generation are in contact with each other. According to the PTL 1, the photocatalytic member is reported to have a high hydrogen generation performance. On the other hand, further improvement for the hydrogen generation performance of the photocatalytic member has been demanded.

JP 2014-046236 A (PTL 2) discloses as an example semiconductor heteroparticles including first semiconductor particles bound to first metal particles and second semiconductor particles bound to second metal particles. In this example, the electric potential of the bottom end of the conduction band of the first semiconductor particle is negative, i.e., less noble, or closer to vacuum level than, relative to the electric potential of the upper end of the valence band of the second semiconductor particle, and furthermore, the work functions relative to a normal hydrogen electrode (NHE) of the first and second semiconductor particles are each independently equal to either the potential of the bottom end of the conduction band of the first semiconductor particle or the electric potential of the upper end of the valence band of the second semiconductor particle, or are each between these potentials. According to the PTL 2, the semiconductor heteroparticles are reported to show a photocatalytic function even without using an electron mediator. In the PTL 2, the photocatalytic activity of the semiconductor heteroparticles, when using a dispersion obtained by dispersing the heteroparticles in water, is specifically evaluated.

JP 2014-223629 A (PTL 3) discloses as an example an electrode which is formed by depositing photocatalyst particles on a base and is used for water photolysis reaction, wherein a semiconductor or good conductor which does not catalyze the reverse reaction of the water photolysis reaction is put between the photocatalyst particles as well as between the photocatalyst particles and the base. The semiconductor or good conductor can improve the electron conductivity of the photocatalytic layer to enhance the photoelectric conversion efficiency, and therefore, can increase the water photolysis reaction rate under light irradiation.

WO 2013/133338 A (PTL 4) discloses as an example an electrode for water photolysis reaction comprising a photocatalytic layer, a current collector layer and a contact layer which has a semiconductor or good conductor and is provided between the photocatalytic layer and the current collector layer. This electrode can increase conductive paths between the photocatalytic layer and the current collector layer without inhibiting light absorption by the photocatalyst.

JP 2012-187520 A (PTL 5) discloses as an example a photocatalyst-fixed product for splitting water, the photocatalyst-fixed product including a photocatalytic layer provided on a base, the photocatalytic layer including a visible light responsive photosemiconductor that is a nitride or oxynitride, a co-catalyst supported on the photosemiconductor, and a hydrophilic inorganic material.

CITATION LIST

Patent Literature

[PTL 1] WO 2014/046305 A
[PTL 2] JP 2014-046236 A
[PTL 3] JP 2014-223629 A
[PTL 4] WO 2013/133338 A
[PTL 5] JP 2012-187520 A

SUMMARY OF INVENTION

Problem to be Solved by the Invention

The present inventors have now found that a photocatalytic member which is capable of showing a high photocatalytic activity under visible light irradiation can be obtained by adding conductive particles to a photocatalytic layer comprising visible light responsive photocatalyst particles for hydrogen generation and visible light responsive photocatalyst particles for oxygen generation and by coupling the visible light responsive photocatalyst particles for hydrogen generation with the visible light responsive photocatalyst particles for oxygen generation. According to the present invention, photolysis of water can be conducted with high efficiency, and a photocatalytic member having a remarkably-improved hydrogen generation performance can be obtained. The present invention is based on such findings.

Accordingly, the object of the present invention is to provide a photocatalytic member having an increased hydrogen generation performance under visible light irradiation.

Solution to Problem

The photocatalytic member according to the present invention comprises a base and a photocatalytic layer fixed on the base, wherein the photocatalytic layer comprises
first photocatalyst particles being visible light responsive photocatalyst particles for hydrogen generation,
second photocatalyst particles being visible light responsive photocatalyst particles for oxygen generation, and
conductive particles which are provided between the first photocatalyst particle and the second photocatalyst particle, have Fermi level at a negative position relative to an electronic energy level at the upper end of the valence band of the first photocatalyst particle and at a positive position relative to an electronic energy level at the bottom end of the conduction band of the second photocatalyst particle, and are able to store an electron and a hole, and wherein the conductive particles are located to be coupled to both the first photocatalyst particles and the second photocatalyst particles.

Effect of Invention

According to the present invention, a photocatalytic member which can split water while showing a high photocatalytic activity under visible light irradiation, and has an increased hydrogen generation performance can be obtained.

EMBODIMENT OF INVENTION

Definition

Figure 1:
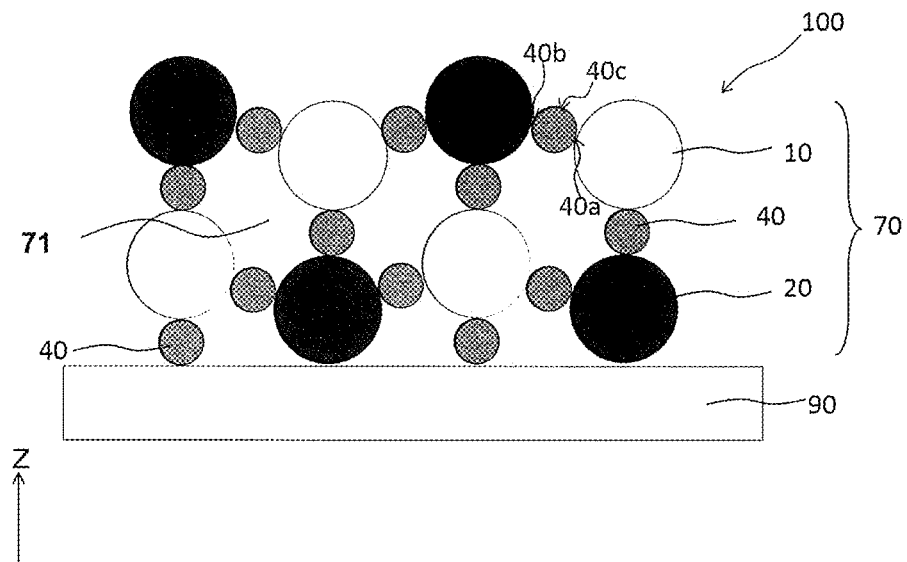
FIG. 1 is a schematic sectional view showing a photocatalytic member according to the present invention.

The term "visible light" as used herein means electromagnetic waves (light) having a wavelength that is visible with the human eye. Preferably, the visible light means light containing a visible light having a wavelength of not less than 380 nm, more preferably light containing a visible light having a wavelength of not less than 420 nm. Light containing visible light includes sunlight, collected sunlight with an energy density enhanced by collection of light, and artificial light sources from such as xenon lamps, halogen lamps, sodium lamps, fluorescent lamps, and light emitting diodes. Preferably, sunlight that inexhaustibly shines down on the earth is used as a light source. Thereby, a visible light that occupies around 52% of the sunlight can be utilized, contributing to an efficient conversion of water into hydrogen and oxygen.

The term "visible light responsive photocatalyst particles for hydrogen generation" as used herein means photocatalyst particles which can generate hydrogen by photolysis of water with visible light. The term "visible light responsive photocatalyst particles for oxygen generation" as used herein means photocatalyst particles which can generate oxygen by photolysis of water with visible light.

The phrase a plurality of particles are "coupled" to one another as used herein means at least a condition in which the plurality of particles are located so that a hole(s) and/or an electron(s) can move between the particles. For example, an embodiment is encompassed in which the plurality of particles are located so that a hole(s) and/or an electron(s) can move between the particles, while the particles are not in physical contact with one another. On the other hand, the phrase a plurality of particles are in "contact" with one another as used herein means a condition in which the plurality of particles are located so that a part of a particle is in contact with a part of another particle. An embodiment in which the plurality of particles are in "contact" with one another encompasses a condition in which a hole(s) and/or an electron(s) can move between the particles by contacting a part of a particle with a part of another particle, namely, a condition in which the particles are electrically coupled to one another. The phrase a plurality of particles are "bound" to one another as used herein means a condition in which the plurality of particles are located to be in stronger contact with one another than the above "contact" condition. The term "bind" as used herein includes a condition in which a plurality of particles are chemically bound to one another.

Photocatalytic Member

The whole constitution of a photocatalytic member according to the present invention is described with reference to FIG. 1.

The photocatalytic member 100 comprises a base 90, a photocatalytic layer 70 fixed on the base 90. The photocatalytic layer 70 contains visible light responsive photocatalyst particles 10 for hydrogen generation (hereinafter simply referred to as "first photocatalyst particles"), visible light responsive photocatalyst particles 20 for oxygen generation (hereinafter simply referred to as "second photocatalyst particles"), and conductive particles 40. In the photocatalytic layer 70, the conductive particle 40 is located to be coupled to the first photocatalyst particle 10 and the second photocatalyst particle 20. The photocatalytic member according to the present invention, by having the constitution as described above, is able to show a high photocatalytic activity under visible light irradiation to split water with high efficiency and to have an exceedingly increased hydrogen generation performance.

Base

The base 90 comprised in the photocatalytic member according to the present invention may be one capable of fixing the photocatalytic layer 70 on the surface thereof. Examples of such base 90 include an organic base, an inorganic base and the like. The organic base includes, for example, a plastic base. The inorganic base includes, for example; a ceramic base such as an alumina base; a glass base such as soda lime glass and borosilicate glass; a quartz base and the like. A base which is not easily decomposed by heating at, for example, 250° C. or higher or 300° C. or higher is more preferable. A base having light transparency may be used.

A metal base can also be used as the base 90. Examples of the metal include titanium, aluminum, iron, stainless steel and the like. In practice, the organic or inorganic base is more preferable than metal base.

In the photocatalytic member according to the present invention, an insulating base can be used as the base 90.

The base 90 is not particularly limited as long as it has a shape allowing the photocatalytic layer 70 to be fixed on the surface thereof by drying or firing. As examples of such base 90, a flat plate body having a smooth surface, e.g., a glass base, an alumina base or the like; or a flat plate body having a porous surface, e.g., anodized alumina; a porous body, e.g., porous ceramics; a fibrous body, e.g., a glass fiber and a carbon fiber can be preferably used. As the fibrous body, a glass fiber with high light transparency can be more preferably used. This allows light to transmit inside rather than light irradiation surface of the fibrous body, and therefore, increase in the amount of light absorption can be expected. The surface shape of the base 90 may be a wavy shape, a comb-like shape, a fibrous shape, or a mesh-like shape.

The base 90 can have a plurality of holes. The diameter of each hole is preferably, for example, 0.1 μm to 30 μm. For example, these holes are preferably arranged as continuous gas holes. Consequently, for example, after hydrogen gas evolved by water splitting reaction on a surface of the photocatalyst particles (10, 20) located in an inside of the photocatalytic layer 70 diffuses in pores 71 (described later) inside the photocatalytic layer 70, the gas can reach an outside of the photocatalytic layer 70, through, for example, these holes having larger opening than the pores 71. Hydrogen gas therefore can generate more efficiently.

Photocatalytic Layer

As shown in FIG. 1, in the photocatalytic member 100, the conductive particles 40 are in contact with both the first photocatalyst particles 10 and the second photocatalyst particles 20 at any site, i.e., at a point, with a surface or the like, on a surface of the conductive particles. In the photocatalytic layer 70, the surface of the conductive particles 40 has a first region 40a, a second region 40b, and a third region 40c. In the first region 40a, the conductive particle 40 is in contact with the first photocatalyst particle 10. In the second region 40b, the conductive particle 40 is in contact with the second photocatalyst particle 20. The third region 40c is a region other than the first region 40a and the second region 40b on the surface of the conductive particle 40. Namely, in the third region 40c, the conductive particles 40 is not in contact with either of the first photocatalyst particle or the second photocatalyst particle.

In the photocatalytic, layer 70, the first photocatalyst particles 10 are coupled to the second photocatalyst particles 20 through the conductive particles 40. For this reason, the degree of electrical coupling between excited holes produced in the valence band VB10 of the first photocatalyst particles 10 and excited electrons produced in the conduction band CB20 of the second photocatalyst particles 20 through the conductive particles 40 becomes stronger. Therefore, in the photocatalytic member 100, charge recombination reaction described later between the photoexcited holes and photoexcited electrons in the conductive particles 40 occurs more reliably. As a result, the photocatalytic activity of the photocatalytic layer 70 can be more reliably increased, and hydrogen generation performance of the photocatalytic layer 70 can be more reliably improved.

In the present invention, the photocatalytic, layer 70 may be a dense continuous layer. The photocatalytic layer 70 may, for example, have a discontinuous part. For example, the photocatalytic layer 70 may be discretely present in an island shape on the surface of the base 90. The photocatalytic layer 70 may be in a condition of wave, comb, fiber, mesh or the like.

The photocatalytic layer 70 has pores 71 in which, for example, water, hydrogen and oxygen gases can be diffused. The pore 71 is, for example, located among the first photocatalyst particle 10, the second photocatalyst particle 20 and the conductive particle 40. Not only the surface of the photocatalytic layer 70 but also the photocatalyst particles located therein can be in contact with water and light through the pore 71.

In the present invention, the thickness of the photocatalytic layer 70 is preferably 0.1 μm or more to 50 μm or less. The thickness of the photocatalytic layer 70 is more preferably 0.2 μm or more to 30 μm or less.

The thickness of the photocatalytic layer 70 can be determined by, for example, a scanning electron microscopic observation of a cross section of the photocatalytic member. Specifically, for example, the thickness is a length from a point on the base 90 to an uppermost portion of the photocatalytic layer 70 in a direction perpendicular to the horizontal tangent at the point. For example, when the base 90 is a flat plate as shown in FIG. 1, the thickness of the photocatalytic layer 70 is a length from the surface of the base 90 to an uppermost portion of the photocatalytic layer 70 in a vertical direction. When the surface of the base 90 is formed of fibers or the like, the thickness of the photocatalytic layer 70 is a length from a point on the surface of the fibers to an uppermost portion of the photocatalytic layer 70 in a direction perpendicular to the horizontal tangent at the point.

Visible Light Responsive Photocatalyst Particle for Hydrogen Generation; First Photocatalyst Particle The first photocatalyst particle 10 is a semiconductor particle having an optical bandgap. When the first photocatalyst particle 10 absorbs visible light, through electron transition such as interband transition in the first photocatalyst particle 10, excited electrons are produced in a conduction band or electron acceptor level present within the bandgap, and excited holes are produced in a valence band or electron donor level present within the bandgap. The first photocatalyst particle 10 is a photocatalyst material, wherein the excited electrons and the excited holes produced therein each can reduce and oxidize reaction objects. This means that the first photocatalyst particle 10 is, for example, a photocatalyst material that allows excited electrons produced under visible light irradiation to reduce water, thereby generating hydrogen. The conduction band or electron acceptor level present within bandgap of the first photocatalyst particle 10 is located, for example, at a negative position relative to the reduction potential of water (0 V vs. NHE, normal hydrogen electrode potential, at pH=0). The valence band or electron donor level present within bandgap of the first photocatalyst particle 10 is located, for example, at a positive position relative to the position of the conduction band of the second photocatalyst particle 20.

Preferred examples of the first photocatalyst particle 10 include one or more selected from the group consisting of perovskite $SrTiO_3$ with at least one of transition metals or noble metals doped, such as Rh-doped $SrTiO_3$ ($SrTi_{1-x}Rh_xO_3$: x=0.002~0.1), Ir-doped $SrTiO_3$ ($SrTi_{1-x}Ir_xO_3$: x=0.002~0.1), Cr-doped $SrTiO_3$ ($SrTi_{1-x}Cr_xO_3$: x=0.002~0.1), Cr- and Ta-doped $SrTiO_3$ ($SrTi_{1-x-y}Cr_xTa_yO_3$: x=0.002~0.1, y=0.002~0.1), La- and Rh-doped $SrTiO_3$ ($Sr_{1-x}La_xTi_{1-y}Rh_yO_3$: x=0.005~0.2, y=0.005~0.2); $Cu_2O$; CuO; $CaFe_2O_4$; NiO; $Bi_2O_3$; BiOX (X=Cl, Br, I); GaN—ZnO solid solution; oxynitrides or nitrides having transition metals or typical metals, such as $LaTiO_2N$, $BaTaO_2N$, $BaNbO_2N$, TaON, $Ta_3N_5$, $Ge_3N_4$; Cu composite sulfuric selenide having a typical metal(s) including Ga, In and Al, such as $CuGaS_2$, $CuInS_2$, $Cu(Ga, In)S_2$, $CuGaSe_2$, $CuInSe_2$, $Cu(Ga, In)Se_2$, $Cu_2ZnSnS_4$ (CZTS), $Cu_2ZnSn(S, Se)_4$; acid sulfate selenides such as $La_5Ti_2CuS_5O_7$, $La_5Ti_2AgS_5O_7$, $La_5Ti_2CuSe_5O_7$, and $La_5Ti_2AgSe_5O_7$.

More preferred examples of the first photocatalyst particle 10 include one or more selected from the group consisting of perovskite $SrTiO_3$ with at least one of transition metals or noble metals doped, such as Rh-doped $SrTiO_3$ ($SrTi_{1-x}Rh_xO_3$: x=0.005~0.05), Ir-doped $SrTiO_3$ ($SrTi_{1-x}Ir_xO_3$: x=0.005~0.05), Cr-doped $SrTiO_3$ ($SrTi_{1-x}Cr_xO_3$: x=0.002~0.1), Cr and Ta-doped $SrTiO_3$ ($SrTi_{1-x-y}Cr_xTa_yO_3$: x=0.002~0.1, y=0.002~0.1), La and Rh-doped $SrTiO_3$ ($Sr_{1-x}La_xTi_{1-y}Rh_yO_3$: x=0.005~0.2, y=0.005~0.2); $Cu_2O$; CuO; $CaFe_2O_4$; NiO; $Bi_2O_3$; BiOX (X=Cl, Br, I); GaN—ZnO solid solution; $LaTiO_2N$; $BaTaO_2N$; $BaNbO_2N$; TaON; $Ta_3N_5$; $Ge_3N_4$; oxysulfides such as $CuGaS_2$, $CuInS_2$, $Cu(Ga, In)S_2$, $CuGaSe_2$, $CuInSe_2$, $Cu(Ga, In)Se_2$, $Cu_2ZnSnS_4$ (CZTS), $Cu_2ZnSn(S, Se)_4$, $La_5Ti_2CuS_5O_7$ and metal-doped compounds thereof, $La_5Ti_2AgS_5O_7$ and metal-doped compounds thereof.

The most preferred examples of the first photocatalyst particle 10 include one or more selected from the group consisting of perovskite $SrTiO_3$ with at least one of transition metals or noble metals doped, such as, Rh-doped $SrTiO_3$($SrTi_{1-x}Rh_xO_3$: x=0.01~0.04), Cr-doped $SrTiO_3$ ($SrTi_{1-x}Cr_xO_3$: x=0.002~0.1), Cr and Ta-doped $SrTiO_3$ ($SrTi_{1-x-y}Cr_xTa_yO_3$: x=0.002~0.1, y=0.002~0.1), La and Rh-doped $SrTiO_3$ ($Sr_{1-x}La_xTi_{1-y}Rh_yO_3$: x=0.005~0.2, y=0.005~0.2); TaON, $Ta_3N_5$.

Average Primary Particle Diameter of the First Photocatalyst Particles

The average primary particle diameter of the first photocatalyst particles 10 is preferably 1,000 nm or less. When the first photocatalyst particles have such a small particle diameter, surface area per unit weight in the first photocatalyst particles capable of being in contact with water becomes large. Thus, the number of reaction sites for reducing water is increased, and consequently, hydrogen can be generated with high efficiency. More preferably, the average primary particle diameter of the first photocatalyst particles 10 is 30 nm or more.

Visible Light Responsive Photocatalyst Particles for Oxygen Generation; Second Photocatalyst Particle The second photocatalyst particle 20 is a semiconductor particle having an optical bandgap. When the second photocatalyst particle 20 absorb visible light, through electron transition such as interband transition in the second photocatalyst particle 20, excited electrons are produced in a conduction band, and excited holes are produced in a valence band. The second photocatalyst particle 20 is a photocatalyst material, wherein the excited electrons and the excited holes produced therein each can reduce and oxidize reaction objects. This means that the second photocatalyst particle 20 is, for example, a photocatalyst material that allows excited holes produced under visible light irradiation to oxidize water, thereby generating oxygen. The valence band of the second photocatalyst particle 20 is located, for example, at a positive position relative to the oxidation potential of water (+1.23 V vs. NHE, normal hydrogen electrode potential, at pH=0). The conduction band of the second photocatalyst particle 20 is located, for example, at a negative position relative to the position of the valence band of the first photocatalyst particle 10.

Preferred examples of the second photocatalyst particle 20 include one or more selected from the group consisting of $BiVO_4$; X-doped $BiVO_4$ (X: Mo, W); $SnNb_2O_6$; $WO_3$; $Bi_7WO_6$; $Fe_2TiO_5$; $Fe_2O_3$; $Bi_2MoO_6$; GaN—ZnO solid solution; oxynitrides or nitrides having transition metals or typical metals, such as $LaTiO_2N$, $BaTaO_2N$, $BaNbO_2N$, TaON, $Ta_3N_5$, $Ge_3N_4$ and the like.

More preferred examples of the second photocatalyst particle 20 include one or more selected from the group consisting of $BiVO_4$; X-doped $BiVO_4$ (X: Mo, W); $SnNb_2O_6$; $WO_3$; $Bi_2WO_6$; $Bi_2MoO_6$; $Fe_2O_3$; GaN—ZnO solid solution; $LaTiO_2N$, $BaTaO_2N$, $BaNbO_2N$, TaON, $Ta_3N_5$ and $Ge_3N_4$.

The most preferred example of the second photocatalyst particle 20 include one or more selected from the group consisting of $BiVO_4$; Mo-doped $BiVO_4$; $WO_3$; $SnNb_2O_6$; $Bi_2WO_6$; $BaTaO_2N$ and $Fe_2O_3$.

Average Primary Particle Diameter of the Second Photocatalyst Particles

The average primary particle diameter of the second photocatalyst particles 20 is preferably 1,000 nm or less. When the second photocatalyst particles have such a small particle diameter, surface area per unit weight in the second photocatalyst particles capable of being in contact with water becomes large. Thus, the number of reaction sites for oxidizing water is increased, and consequently, oxygen can be generated with high efficiency. More preferably, the average primary particle diameter of the second photocatalyst particles 20 is 30 nm or more.

Approach for Evaluating Average Primary Particle Diameter of First and Second Photocatalyst Particles Regarding an approach for evaluating the average primary particle diameter of the first photocatalyst particles 10 and the second photocatalyst particles 20, the average primary particle diameter can be defined, for example, by an average value obtained by circle approximation of 50 crystal particles in an observation under a scanning electron microscope (manufactured by Hitachi, Ltd., "S-4100," hereinafter also referred to as "SEM") at a magnification of 40,000 times.

Conductive Particle

Figure 2:
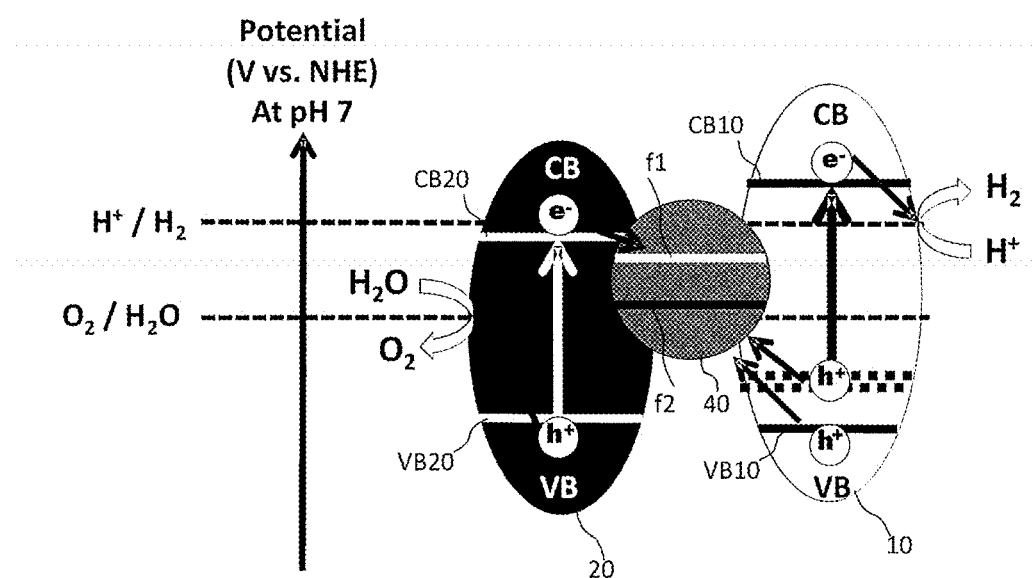
FIG. 2 is a schematic sectional view for explaining conductive particles in the present invention, and the mechanism of photolysis of water.

FIG. 2 is a schematic sectional view for explaining conductive particles in the present invention and the mechanism of photolysis of water. The conductive particle 40 is described with reference to FIG. 2.

Definitions

In the present invention, the conductive particle 40 is a particle which has conductivity, has Fermi level at a negative position relative to an electronic energy level at the upper end of the valence band VB 10 of the first photocatalyst particle 10 and at a positive position relative to an electronic energy level at the bottom end of the conduction band CB 20 of the second photocatalyst particle 20, and can store an electron(s) and a hole(s). The conductive particle 40 having such a particular Fermi level can remarkably improve photolysis of water by the photocatalytic member 100 due to a mechanism described below. Regarding the Fermi level of the conductive particle, it can be represented using as a standard electric potential instead of electronic energy level. In this case, the conductive particle 40 has Fermi level at a negative position relative to an electric potential at the upper end of the valence band VB 10 of the first photocatalyst particle 10 and at a positive position relative to electric potential at the bottom end of the conduction band CB 20 of the second photocatalyst particle 20.

Materials

Examples of preferred materials of the conductive particle 40 include one or more selected from the group consisting of metals such as gold, silver, copper, nickel, rhodium and palladium; carbon materials; nitrides such as TiN; carbides such as TiC; conductive metal oxides such as manganese oxides ($MnO_2$, $AMnO_3$ (A: Ca or Sr), and B-doped $AMnO_3$ (A: Ca or Sr, B: $La^{3+}$, $Y^{3+}$, $Bi^{3+}$, $Nb^{5+}$ or $Ta^{5+}$)), tin-doped indium oxide (ITO), metal (B, Al, Ga)-doped zinc oxides, fluorine-doped tin oxide, antimony-doped tin oxide, ruthenium oxide, iridium oxide, rhodium oxide, and spinel-typed oxides $AB_2O_4$ (A=Fe, Ni, Mn, Co, Zn etc., B=Fe, Co, Mn, etc., A=B will be OK, or A≠B will be also OK). Among them, one or more selected from the group consisting of gold; carbon materials; conductive metal oxides such as ITO; metal (B, Al, Ga)-doped zinc oxides, ruthenium oxide, iridium oxide, magnetite ($Fe_3O_4$) are more preferable. As the carbon materials, for example, carbon black, ketjen black, acetylene black, channel black, furnace black, thermal black, lamp black and the like can be used.

When the materials of the conductive particle and photocatalyst particle are both metal oxide, the conductive particle can have an excellent binder effect, which allows the photocatalyst particle and conductive particle to be in stronger contact with each other, because the conductive particle and photocatalyst particle are both metal oxide. When the material of the base is a glass or an inorganic material such as alumina, in particular, a metal oxide and when the material of the conductive particle is also a metal oxide, a metal-oxygen bond is formed between the base and the conductive particle. Therefore, adhesion between the conductive particle and the base is improved. As a result, the mechanical strength of the entire photocatalytic member can be improved. Therefore, when the photocatalytic member is mounted to the hydrogen production module, the photocatalytic layer can prevent the photocatalyst particles from being peeled off by the load of running water, and therefore, can work as a photocatalytic film having an excellent durability for a long period of time. When the material of the conductive particle is a metal oxide, the conductive particle having a crystal structure is more preferable than that having an amorphous structure. Thereby, a high conductivity as well as a high stability to oxidation and reduction can be obtained.

Barium, cesium and sodium generally known as a conductive material have a low work function and therefore do not have Fermi level as described above. Therefore, these materials are not treated as the conductive particle 40 in the present invention.

Shape and Particle Condition

Figure 9:
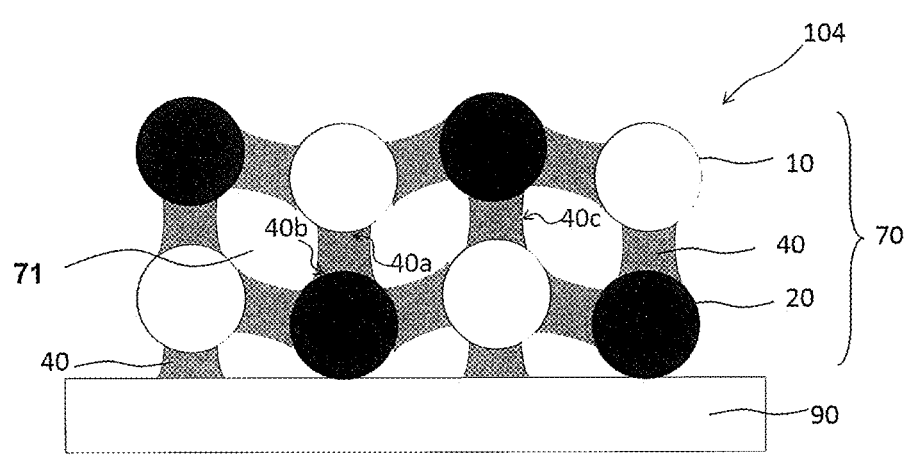
FIG. 9 is a schematic sectional view showing a photocatalytic member according to the present invention.
Figure 10:
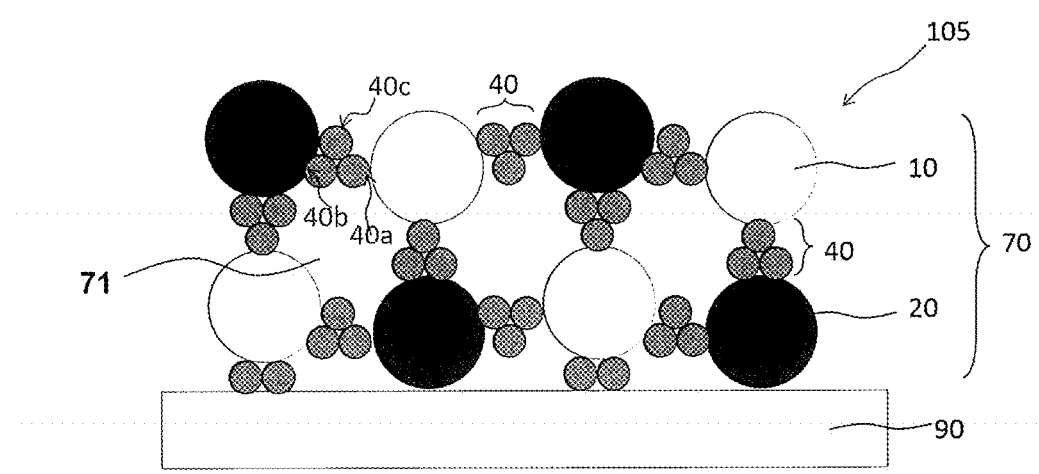
FIG. 10 is a schematic sectional view showing a photocatalytic member according to the present invention.

The conductive particle 40 can be in any particulate condition. The conductive particle 40 can be, as shown in FIG. 1, for example, a so-called primary particle. In this case, one conductive particle 40 can be in contact with both the first photocatalyst particle 10 and second photocatalyst particle 20. Alternatively, the conductive particles 40 can be, as shown in FIG. 10 described later, for example, so-called a secondary particle which is in a condition that a primary particles are aggregated. In this case, the first photocatalyst particle 10 is in contact with the second photocatalyst particle 20 through an aggregate of a plurality of conductive particles 40. Alternatively, the conductive particles 40 can be, for example, as shown in FIG. 9 described later, in a condition that a plurality of primary particles and/or singular or multiple secondary particles are joined by, for example, heating them. All of the above embodiments are encompassed the condition that a conductive particle 40 is coupled to both the first photocatalyst particle 10 and the second photocatalyst particle 20 through the conductive particle 40.

In the present invention, the conductive particle 40 can have any shape. The shape of the conductive particle 40 is, for example, isotropic shape (spherical, approximate polygonal, etc.) or anisotropic shape (columnar, rod-like, plate-like, flaky, etc.). As a conductive particle of anisotropic shape, for example, a conductive wire can be used. Example of the conductive wire includes particle having a rod-like or needle-like form.

Average Primary Particle Diameter

In the present invention, the average primary particle diameter of the conductive particles 40 is preferably smaller than the average primary particle diameter of each of the first photocatalyst particles 10 and the second photocatalyst particles 20. Thereby, in the photocatalytic layer 70, for example, light can be effectively irradiated to the first and second photocatalyst particles 10 and 20. When the average primary particle diameter of the conductive particles 40 is smaller than the average primary particle diameter of each of the first photocatalyst particles 10 and the second photocatalyst particles 20, the number of contact points between the base 90 and the respective particles constituting the photocatalytic layer 70 per unit area can be increased. Therefore, adhesion between the photocatalytic layer 70 and the base 90 can be improved.

The average primary particle diameter of the conductive particles 40 can be appropriately adjusted to the range where light irradiation to the first photocatalyst particles 10 and the second photocatalyst particles 20 is secured. For example, when particles having light transparency are used as the conductive particles 40, the particles having a relatively large particle diameter can be used. On the other hand, when particles having no light transparency are used as the conductive particles 40, the particles having a smaller particle diameter are preferably used.

The average primary particle diameter of the conductive particles 40 is, for example, preferably 1 nm or more to 1,000 nm or less, more preferably 5 nm or more to 500 nm or less, even more preferably 5 nm or more to 200 nm or less. Thereby, in the photocatalytic layer 70, visible light can be effectively irradiated to the first photocatalyst particles 10 and the second photocatalyst particles 20. Furthermore, in the photocatalytic layer 70, for example, the conductive particles 40 can be well in contact with the photocatalyst particles 10 and 20. Furthermore, proper pores 71 can be formed in the photocatalytic layer 70. When the average primary particle diameter of the conductive particles is adjusted to be a relatively large within the above range, the probability of occurrence of charge recombination reaction between the first photocatalyst particles 10 and the second photocatalyst particles 20 can be increased. As a result, a high water-splitting activity can be more reliably obtained in the photocatalytic member.

The average primary particle diameter of the conductive particles 40 is most preferably 10 nm or more to 200 nm or less. When the diameter is in the above range, the conductive particles 40 not only allows the first photocatalyst particles 10 and the second photocatalyst particles 20 to be coupled to each other, but also can exhibit an excellent function as a binder to enhance adhesion among the photocatalyst particles.

When the conductive particles 40 are particles of isotropic shape, the average primary particle diameter is, for example, preferably 1 nm or more to 1,000 nm or less, more preferably 5 nm or more to 500 nm or less, even more preferably 5 nm or more to 200 nm or less, most preferably 10 nm or more to 200 nm or less. Having such an average primary particle diameter, the conductive particles 40 can be in efficient contact with the photocatalyst particles 10 and 20. Furthermore, prevention of light absorption of the photocatalyst particles 10 and 20 by the conductive particles 40 can be suppressed. In the present invention, when the conductive particles 40 are particles of isotropic shapes, for example, the average primary particle diameter thereof may be a diameter obtained by converting the area of the conductive particles 40 obtained by a SEM or TEM observation to the area of a circle. Alternatively, the average primary particle diameter of the conductive particles 40 may be a diameter of the largest cross-section of the conductive particles 40.

When the conductive particles 40 are particles of anisotropic shape, the aspect ratio, i.e., major axis diameter/minor axis diameter, of the conductive particles 40 is preferably 5 or more to 1,000 or less. When the aspect ratio is within the above range, the probability that the first photocatalyst particles 10 and the second photocatalyst particles 20 are in contact with the conductive wires can be sufficiently increased. Therefore, charge recombination reaction described later is facilitated. Consequently, photolysis of water can be efficiently conducted. When the conductive particles 40 of anisotropic shape are used, the binder effect caused by the conductive particles 40 can be enhanced.

When a conductive wire is used as the conductive particle 40 of anisotropic shape, the average primary particle diameter thereof is, for example, preferably 1 nm or more to 1,000 nm or less, and more preferably 5 nm or more to 200 nm or less. The average primary particle diameter of the conductive wire refers to a diameter obtained by circular approximation of a cross section having the smallest cross-section area of the conductive wire.

The length of the major axis of the conductive wire is not particularly limited, and is preferably 10 nm or more to 10,000 nm or less. By having such a shape and size, the conductive wire can be in efficient contact with the photocatalyst particles 10 and 20. Furthermore, prevention of light absorption of the photocatalyst particles 10 and 20 by the conductive particles 40 can be suppressed. In addition, the binder effect caused by the conductive particles 40 can be enhanced.

When a conductive plate having a plate-like or flake-like form is used as the conductive particle 40 of anisotropic shape, major axis diameter of the plate surface or flake is preferably 20 nm or more to 1,000 nm or less. The average primary particle diameter of the plate surface or flake is preferably 1 nm or more to 1,000 nm or less. The average primary particle diameter of the conductive plate refers to, for example, a diameter obtained by circular approximation of a cross section having the smallest cross-section area of the conductive plate. The aspect ratio, i.e., major axis diameter/minor axis diameter, of the conductive plate is, for example, preferably 3 or more to 5,000 or less, and more preferably 10 or more to 1,000 or less. When the conductive plate having such a shape and size is used as the conductive particle 40, the conductive particle 40 can be in efficient contact with the photocatalyst particles 10 and 20. Furthermore, prevention of light absorption of the photocatalyst particles 10 and 20 by the conductive particles 40 can be suppressed. In addition, the binder effect caused by the conductive particles 40 can be enhanced.

Conductivity and Volume Resistivity

The conductivity of the conductive particle 40 is preferably 0.1 $Scm^{-1}$ or more. The volume resistivity of the conductive particle 40 is, for example, preferably 10 $\Omega$cm or less.

Contents

In the present invention, the photocatalytic member preferably contains the conductive particles 40 in such an amount that the number of electrical coupling points between the first photocatalyst particles 10 and the second photocatalyst particles 20 can be increased. The photocatalytic member preferably contains the conductive particles 40 in such an amount that light absorption by the first photocatalyst particles 10 and the second photocatalyst particles 20 cannot be prevented. The content can be appropriately decided in consideration of the average primary particle diameter of the first photocatalyst particles 10, the second photocatalyst particles 20 and the conductive particles 40, or the specific gravity of the conductive particles 40. The content is, for example, preferably, appropriately decided in such a range that pores 71 can be formed in the photocatalytic layer 70. For example, the conductive particles 40 is preferably contained in amount of 1 wt % or more to 99 wt % or less relative to the total content of the first photocatalyst particles 10, the second photocatalyst particles 20 and the conductive particles 40. The content ratio of the conductive particles 40 is preferably 5 wt % or more to 60 wt % or less, and more preferably 5 wt % or more to 50 wt % or less.

Mechanism of Photolysis of Water

The property and function of the conductive particles 40 as well as the mechanism of splitting water by the photocatalytic member 100 are described with reference to FIG. 2 again.

It is considered that, as shown in FIG. 2, by irradiating visible light, excited holes produced in the valence band VB10 of the first photocatalyst particles 10 diffuse to the surface of the first photocatalyst particles 10 and transfer inside the conductive particles 40 having Fermi level at a negative position relative to an electronic energy level at the upper end of the valence band VB10. It is also considered that, by irradiating the visible light, excited electrons produced in the conduction band CB20 of the second photocatalyst particles 20 diffuse to the surface of the second photocatalyst particles 20 and transfer inside the conductive particles 40 having Fermi level at a positive position relative to an electronic energy level at the bottom end of the conduction band CB20. It is considered that the photoexcited holes produced in the valence band VB10 of the first photocatalyst particles 10 and the photoexcited electrons produced in the conduction band CB20 of second photocatalyst particles 20 both stored inside the conductive particles 40 react to each other to occur charge recombination reaction, thereby resulting in disappearance of these two excited carriers. The charge recombination reaction is considered to allow the photoexcited holes and the photoexcited electrons, which were conventionally uninvolved in water photolysis reaction and rather had a tendency to decrease the photocatalytic activity of the individual particle in water photolysis reaction, to be disappeared with high efficiency, thereby resulting in occurrence of water photolysis reaction with high efficiency. Namely, the disappearance of the photoexcited holes produced in the first photocatalyst particles 10 and the photoexcited electrons produced in the second photocatalyst particles 20 due to charge recombination reaction is considered to be able to increase the efficiency of water reduction reaction proceeded by the photoexcited electrons produced in the conduction band CB10 of the first photocatalyst particles 10. As a result, the first photocatalyst particles 10 and the second photocatalyst particles 20 both electrically coupled to each other through the conductive particles 40 can exhibit a high photocatalytic activity to realize improvement of hydrogen generation performance. In FIG. 2, f1 indicates Fermi level of tin-doped indium oxide (ITO) as the conductive particle 40, and f2 indicates Fermi level of gold (Au) as the conductive particle 40. The above descriptions are hypothetical and the present invention is not limitedly understood by the descriptions.

Work Function

In the present invention, Fermi level of the conductive particles 40 can be estimated by using work function that is the energy difference between vacuum level and Fermi level. The work function can be obtained by, for example, electric potential measurement using a Kelvin probe force microscope (KPFM).

Covering Portion

In the present invention, preferably, the photocatalytic layer 70 of the photocatalytic member 100 further comprises a covering portion(s) that covers at least a part of the third region 40c of the conductive particles 40. Having the covering portion(s) 60, the photocatalytic layer 70 is able, for example, to prevent the reverse reaction described later, to facilitate detachment of hydrogen gas and oxygen gas generated, to prevent the conductive particles 40 and the first and second photocatalyst particles 10 and 20 from being peeled off the base, or to prevent oxidation of the conductive particles. Therefore, the covering portion(s) 60 can enhance durability of the photocatalytic layer 70 or can enhance water splitting performance. It can also improve activity and stability of the conductive particles in water splitting reaction in water.

The covering portion preferably covers almost all of the third region 40c of the conductive particles 40, and more preferably covers all of the region. In an embodiment in which the covering portion covers only the third region 40c of the conductive particles 40 as described above, since the surfaces of the first photocatalyst particles 10 and the second photocatalyst particles 20 are not covered with the covering layer, the activity of the photocatalyst particles can be maintained. In an embodiment in which the covering portion covers a part or all of the third region 10c of the first photocatalyst particles 10 and the third region 20c of the second photocatalyst particles 20 in addition to the third region 40c of the conductive particles 40, for example, strength of the photocatalytic layer 70 is increased and durability thereof is also improved. In this embodiment, since a part of the surface of the photocatalyst particles are covered, the covering layer is desirably adjusted so as to well keep the balance between maintenance of the activity of the photocatalyst particles and strength of the photocatalytic layer.

An example that the coating portion exhibits a reverse reaction preventing effect in the present invention is described.

The photocatalytic member of the present invention can split water by irradiating visible light to generate hydrogen and oxygen. In this case, there may be a problem that hydrogen gas and oxygen gas evolved by water splitting reaction in water react to each other using the conductive particles as catalysts on the surface of the conductive particles to occur reverse reaction by which water is produced, thereby resulting in decrease of the amount of hydrogen and oxygen evolved. When the conductive particles are metal particles such as gold, the metal particles act as catalysts for the reverse reaction, there is a tendency that the reverse reaction is promoted. In contrast, reverse reaction can be prevented by splitting water, for example, under reduced pressure, but a more simple method is practically preferred. In the present invention, it is found that by providing the covering portion 60 on the conductive particles 40, hydrogen or oxygen molecule evolved by water splitting is diffused to the third region 40c, namely, the outer surface of the conductive particles 40, and therefore, the production of water on the surface of the conductive particles 40 accompanying with reverse reaction of hydrogen and oxygen can be prevented. Therefore, reverse reaction can be effectively prevented with a simple constitution, and the decrease of the hydrogen generation performance can be suppressed.

An example that the coating portion 60 exhibits an effect of enhancing the detachment of gases generated in the present invention is described.

The photocatalytic layer 70 in the present invention contains fine photocatalyst particles (10, 20) and conductive particles 40, and has pores 71 among these particles. On a surface of the photocatalytic layer 70, the surface being in contact with water and light, water splitting is occurred to generate hydrogen gas and oxygen gas. In this case, when hydrogen gas and oxygen gas are not detached from the surface of the photocatalytic layer 70, an amount of gases evolved is not increased. Therefore, a hydrophilic covering portion(s) 60 is provided on at least one of the third region 40c of the conductive particles 40, the third region 10c of the first photocatalyst particles 10, and the third region 20c of the second photocatalyst particles 20, detachment of hydrophobic hydrogen and oxygen gases from the photocatalytic layer 70 is promoted.

An example that the coating portion 60 exhibits a peeling-off preventing effect in the present invention is described.

The photocatalytic member according to the present invention is exposed, during use, for a long period of time, to a condition of being in contact with flowing water or the like. Therefore, it is important that the photocatalytic layer 70 is not peeled off from the base 90. In order to impart practically sufficient adhesion strength between the photocatalytic layer 70 and the base 90, for example, it is considered that the photocatalytic layer 70 is fixed to the base by firing at a high temperature. However, for mass production and cost reduction, it is preferable that firing is not conducted, or sufficient adhesion is secured even by firing at a low temperature.

In the present invention, in the photocatalytic layer 70, the covering portion 60 is provided on at least a part of the conductive particles 40. Thereby, adhesion strength between the conductive particles 40 which have the smallest particle diameter and are easily peeled and the first and second photocatalyst particles 10 and 20 can be increased to prevent the particles from being peeled. The covering portion 60 can be formed using a particle that functions as a filler increasing adhesion between the photocatalytic layer 70 and the base 90.

The covering portion 60 can be formed by using, for example, fine particles of glass frit or inorganic oxides. As the glass frit, glass frit with low melting point is preferably used as materials thereof. As for the inorganic oxides, for example, silica, alumina, $ZrO_2$, $TiO_2$ are preferably used. The average primary particle diameter of the fine particles of the glass frit or the inorganic oxides is preferably 100 nm or less. When the diameter is within this range, water as well as hydrogen and oxygen gases can be smoothly diffused into the photocatalytic layer without reducing the photocatalytic activity.

An example that the coating portion 60 exhibits an antioxidant effect in the present invention is described.

When the conductive particles are, for example, carbon materials, the carbon materials have a tendency to be easily oxidized. When the carbon materials are oxidized, for example, their conductivity is damaged, they cannot sufficiently function as conductive particles 40, and water splitting performance may be decreased over time. Therefore, providing the covering portion 60 on at least a part of the conductive particles 40 can, even when materials easily oxidized are selected as the conductive particles 40, for example, suppress surface oxidation of the conductive particles accompanying with the photocatalysis.

In the present invention, a condition of the covering portion 60 includes, for example, a continuous layer or discontinuous island-shaped structure. For the purpose of preventing reverse reaction, the condition can be, for example, a discontinuous island-shaped structure, so long as the contact between hydrogen molecules or oxygen molecules and the conductive particles 40 is inhibited. For example, colloidal particles can be supported on the third region 40c of the conductive particles 40. For the purpose of preventing being peeled, the covering portion 60 can be constituted by, for example, a dense continuous layer. The thickness can be appropriately decided within a range that water splitting performance is not inhibited. The covering portion 60 can be analyzed by a transmission electron microscope (TEM) observation at high magnification of a fracture surface of the photocatalytic member.

In the present invention, the covering portion 60 preferably includes, for example, a hydroxide, oxide or phosphate of one selected from the group consisting of iron, silicon, chromium, titanium, zirconium, tantalum, niobium, aluminum, magnesium, lanthanum, and cerium. Diiron trioxide ($Fe_2O_3$), silica ($SiO_2$), zirconium oxide ($ZrO_2$), tantalum oxide ($Ta_2O_5$), cerium oxide ($CeO_2$) are more preferable. Diiron trioxide and zirconium oxide are still more preferable. The thickness t60 of the covering portion 60 is preferably 0.5 nm or more to 50 nm or less, more preferably 2 nm or more to 10 nm or less, or 2 nm or more to 5 nm or less. When the covering portion is formed of colloidal particles, a single-particle-film is preferable. When the covering portion is formed of metal monomers, the thickness thereof is preferably less than 10 nm. As a material constituting the covering portion, a hydrophilic material can be suitably used.

Figure 3:
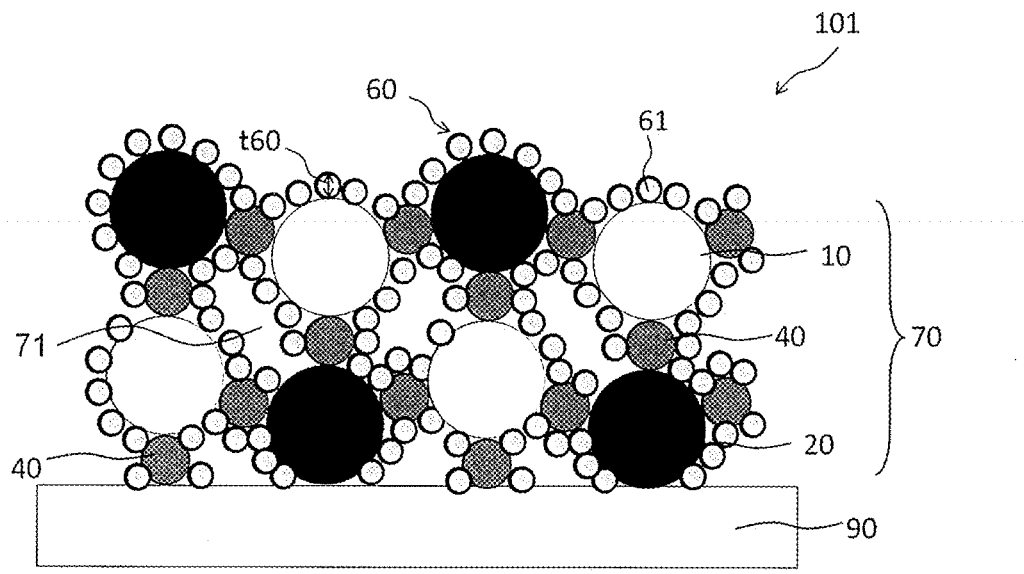
FIG. 3 is a schematic sectional view showing a photocatalytic member according to the present invention.
Figure 4:
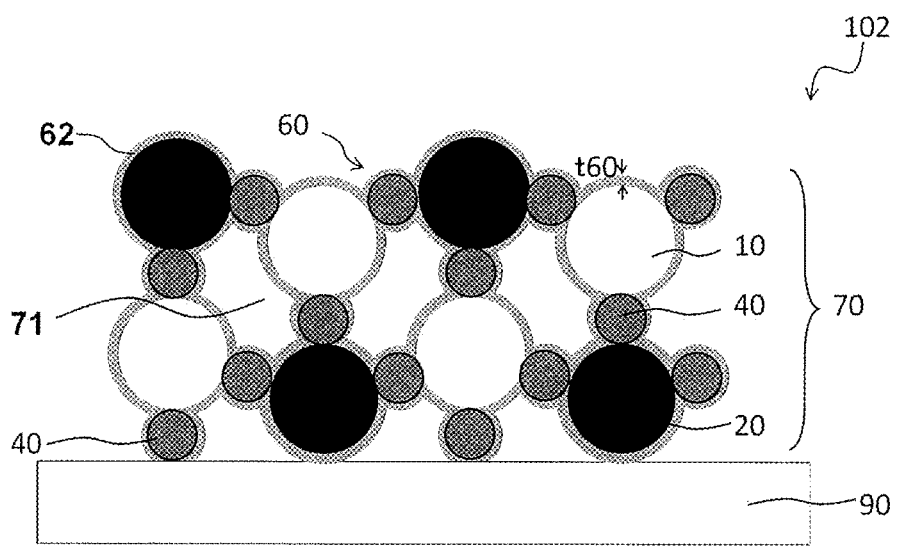
FIG. 4 is a schematic sectional view showing a photocatalytic member according to the present invention.
Figure 5:
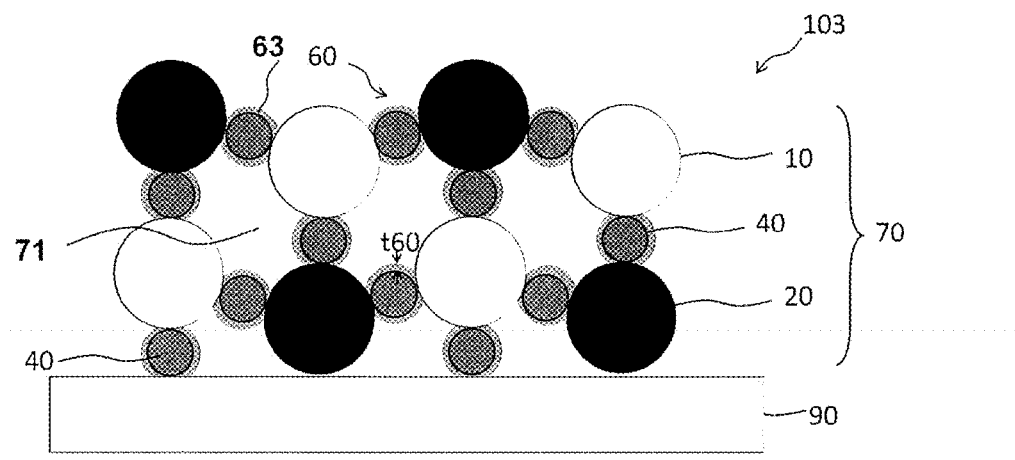
FIG. 5 is a schematic sectional view showing a photocatalytic member according to the present invention.

Examples of the covering portion 60 are described in more detail with reference to FIGS. 3-5. FIGS. 3-5 are schematic sectional views for explaining the photocatalytic member according to the present invention. As a first example, the photocatalytic member 101 is shown. As shown in FIG. 3, in the photocatalytic member 101, the photocatalytic layer 70 includes a covering portion(s) 60. In this example, the covering portion 60 includes a plurality of colloidal particles 61. In the photocatalytic member 101, the plurality of colloidal particles 61 are located on the first and second photocatalyst particles (10, 20) as well as on the third region 40c, i.e., the outer surface of the conductive particles 40. The outer surface means a part(s) (the third region 40c), on the surface of the object particle, other than a part(s) which are in physical contact with particles other than the object particle contained in the photocatalytic layer 70 (the first region 40a, the second region 40b).

The outer surface of the first photocatalyst particles 10 means, on the surface of the first photocatalyst particles 10, parts other than parts which are in physical contact with particles contained in the photocatalytic layer 70 such as the conductive particles 40 and the second photocatalyst particles 20. The surface of the first photocatalyst particles 10 has the first region 10a, the second region 10b and the third region 10c. In the first region 10a, the first photocatalyst particles 10 are in contact with the second photocatalyst particles 20. In the second region 10b, the first photocatalyst particles 10 are in contact with the conductive particles 40. In the first photocatalyst particles 10, the third region 10c is a region other than the first region 10a and the second region 10b. The third region 10c corresponds to the outer surface of the first photocatalyst particles 10.

The outer surface of the second photocatalyst particles 20 means, on the surface of the second photocatalyst particles 20, parts other than parts which are in physical contact with particles contained in the photocatalytic layer 70 such as the conductive particles 40 and the first photocatalyst particles 20. The surface of the second photocatalyst particles 20 has a first region 20a, the second region 20b and the third region 20c. In the first region 20a, the second photocatalyst particles 20 are in contact with the first photocatalyst particles 10. In the second region 20b, the second photocatalyst particles 20 are in contact with the conductive particles 40. In the second photocatalyst particles 20, the third region 20c is a region other than the first region 20a and the second region 20b. The third region 20c corresponds to the outer surface of the second photocatalyst particles 20.

In the photocatalytic member 101, a plurality of colloidal particles 61 are located as the covering portion 60 on the outer surface of the conductive particles 40, i.e., the third region 40c. Therefore, reverse reaction and oxidation of the conductive particles 40 can be effectively suppressed. When hydrophilic particles are used as colloidal particles 61, detachment of gases can be facilitated, thereby improving hydrogen generation performance. In the photocatalytic member 101, strength of the photocatalytic layer 70 is enhanced, thereby improving durability thereof.

As a method for forming the covering portion 60 including a plurality of colloidal particles 61, for example, a method can be used which comprises steps of forming a layer containing the first photocatalyst particles 10, the second photocatalyst particles 20 and the conductive particles 40 on the base, and thereafter, adsorbing a dispersion containing the colloidal particles 61 which will become the covering portion 60 on surface of the layer. Alternatively, a method can be used in which colloids are directly deposited on the surface of the conductive particles 40 by chemical reduction method, photoreduction method or the like. Alternatively, a method can be used in which a layer containing the first photocatalyst particles 10, the second photocatalyst particles 20, the conductive particles 40 and the colloidal particles 61 which will become the covering portion 60 is formed on the base 90. In this case, by reducing the blending ratio, i.e., weight ratio of the photocatalyst particles, the colloidal particles and the conductive articles in this order, or by reducing the blending ratio of the photocatalyst particles, the conductive particles and the colloidal particles in this order, for example, both a highly efficient photocatalytic property and prevention of reverse reaction can be simultaneously achieved. Alternatively, the primary particle diameter of the photocatalyst particles, colloidal particles and conductive particles can be set to be small in this order, or the primary particle diameter of the photocatalyst particles, conductive particles and colloidal particles can be set to be small in this order.

As a second example, the photocatalytic member 102 is shown. As shown in FIG. 4, in the photocatalytic member 102, the photocatalytic layer 70 includes a covering portion(s) 60. The covering portion 60 is composed of, for example, a continuous covering layer 62. The covering layer 62 is located to cover the outer surfaces, namely, the third regions 10c, 20c and 40c, of the first photocatalyst particles 10, the second photocatalyst particles 20 and the conductive particles 40, respectively. In this example, the covering layer 62 has a nearly continuous layer structure. The covering layer 62 can partially have a discontinuous part. The covering layer 62 can, for example, effectively suppress reverse reaction, oxidation of the conductive particles 40 and others. When the covering portion is a hydrophilic one, detachment of gases evolved can be facilitated. In the photocatalytic member 102, strength of the photocatalytic layer 70 is enhanced, and durability thereof is also improved. The covering layer 62 can be in an amorphous phase, a crystalline phase or a hydroxide phase.

As a method for forming the covering layer 62, for example, a method can be used in which a raw material containing a monomeric, oligomeric or polymeric metal is adsorbed on the surface of the conductive particles 40 and/or the photocatalyst particles 10 and 20, and optionally, the raw material is polymerized on the surface of the conductive particle 40 and/or the photocatalyst particles 10 and 20 by heating or chemical reaction can be used. Thereby, a covering layer can be formed. The covering layer can be also formed by a dry film forming method such as sputtering method, vapor deposition method, CVD method, atomic layer deposition method, etc.; or a chemical reduction method; or photoreduction method.

As a third example, the photocatalytic member 103 is shown. As shown in FIG. 5, in the photocatalytic member 103, the photocatalytic layer 70 includes the covering portions 60. The covering portions 60 are composed of the covering layers 63. The covering layers 63 are located on only the outer surface, i.e., the third region 40c, of the conductive particles 40. Therefore, reverse reaction, oxidation of the conductive particles 40 and others can be suppressed without inhibiting water splitting activity of the first and second photocatalyst particles 10 and 20. When the covering portion is a hydrophilic one, detachment of gases evolved can be facilitated. Furthermore, adhesion between the conductive particles 40 and the first and second photocatalyst particles 10 and 20 can be improved, and strength of the photocatalytic layer 70 can be increased.

As a method for forming the covering layers 63, for example, a method can be used in which a raw material molecule containing a monomeric, oligomeric or polymeric metal is adsorbed on the surface of the conductive particles 40, and optionally, the raw material molecule is polymerized on the surface of the conductive particle 40 by heating or chemical reaction can be used. Thereby, a covering layer 63 can be formed. The covering layers 63 can be also formed by chemical reduction method, photoreduction method or the like in which a molecule containing a monomeric, oligomeric or polymeric metal is used as a raw material. Alternatively, a functional group capable of forming electrostatic interaction with the conductive particles 40 such as metal-carboxylic acid bond or, for example, a specific and strong chemical bond to the conductive particles 40 such as metal-sulfur bond can be introduced into a raw material molecule containing a metal. Thereby, the covering layers 63 can be selectively located on the surface of the conductive particles 40.

Intermediate Layer

Figure 6:
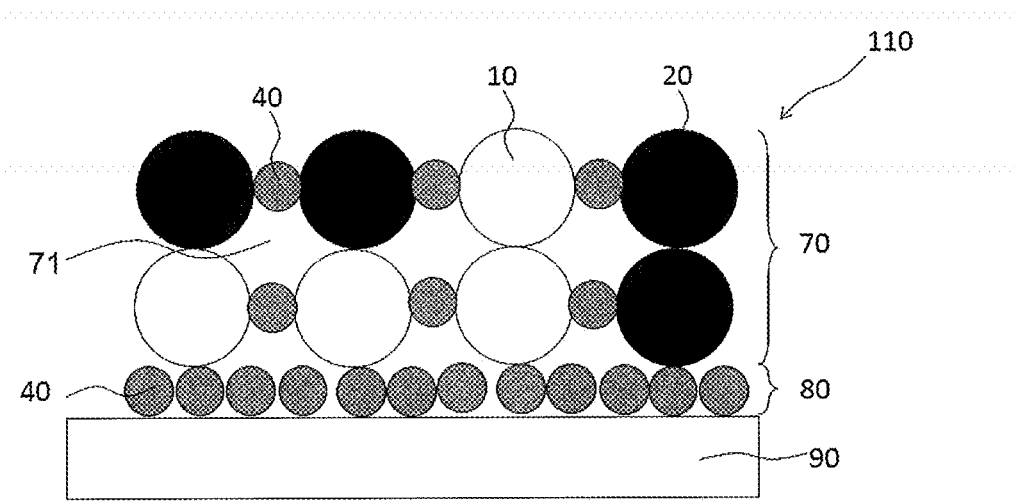
FIG. 6 is a schematic sectional view showing a photocatalytic member according to the present invention.
Figure 7:
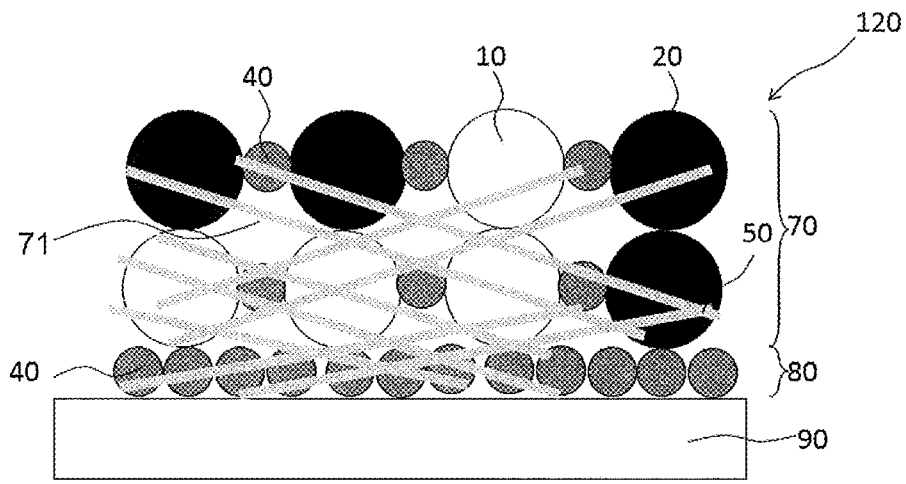
FIG. 7 is a schematic sectional view showing a photocatalytic member according to the present invention.

According to a preferred embodiment of the present invention, as shown in FIGS. 6 and 7, the photocatalytic member 100 can further comprises an intermediate layer 80 between the base 90 and the photocatalytic layer 70. The intermediate layer 80 is located between the base 90 and the photocatalytic layer 70 and is coupled to each of the base 90 and the photocatalytic layer 70. Thus, for example, adhesion between the base 90 and the photocatalytic layer 70 can be improved. A material used for the intermediate layer 80 includes, for example, the conductive particle 40 and a non-conductive particle having small aspect ratio described later. An intermediate layer 80 formed with the conductive particle 40 has an excellent water-photolysis performance. An intermediate layer 80 formed with the non-conductive particle having small aspect ratio functions as a binder and allows the photocatalytic layer 70 to strongly adhere to the base 90. When the photocatalytic member 100 comprises the intermediate layer 80, the thickness of the intermediate layer 80 can be evaluated by a scanning electron microscope observation of a fracture surface of the layer.

Other Particle(s)

According to a preferred embodiment of the present invention, the photocatalytic layer 70 of the photocatalytic member 100 can further include an other particle(s) other than the photocatalyst particles 10 and 20 and the conductive particles 40.

In the present invention, the other particle is preferably a particle which does not cover the surfaces of the photocatalyst particles 10 and 20. Thereby, decrease in the photocatalytic activity of the photocatalytic member 100 can be suppressed. Preferred examples of the other particle include a particle having small aspect ratio. As the other particle, a particle having small absorption of visible light is preferably used. Thereby, inhibition of light absorption by the photocatalyst particles 10 and 20 can be suppressed.

Co-Catalyst of Photocatalyst Particle

In the present invention, when photolysis of water is conducted using the first photocatalyst particles 10 and the second photocatalyst particles 20, a co-catalyst can be supported on surface of these photocatalyst particles. Thereby, water reduction and oxidation reactions are promoted, and hydrogen and oxygen evolving efficiency is improved. The co-catalyst is supported, for example, on a part of the third region 10c of the first photocatalyst particles 10 and/or the third region 20c of the second photocatalyst particles 20.

As co-catalysts of the first photocatalyst particles 10, one or more selected from the group consisting of metal particles such as platinum, ruthenium, iridium, rhodium and others; or one or more selected from the group consisting of oxide particles such as ruthenium oxide, nickel oxide and others; or a mixture of the metal particles or the oxide particles; or a composite hydroxide or a composite oxide containing rhodium and chromium can be preferably used. More preferably, metal particle such as platinum or ruthenium; or a composite hydroxide or a composite oxide containing rhodium and chromium can be used. When the co-catalyst is supported in a particulate form on the surface of the first photocatalyst particles 10, the activation energy in reduction reaction of water can be reduced, thereby resulting in execution of rapid hydrogen generation.

In the present invention, at least a part of the part other than the part which is in physical contact with the first photocatalyst particles 10 in the surface of the co-catalyst supported on the first photocatalyst particles 10 can be covered with another layer. Thereby, production of water molecules due to reverse reaction of hydrogen and oxygen molecules on the surface of the co-catalyst supported on the first photocatalyst particles 10 can be suppressed. Another layer preferably contains an amorphous oxide or hydroxide; an oxide crystal; or a phosphate having at least one selected from silicon, chromium, titanium, zirconium, tantalum, niobium, aluminum and magnesium. The material constituting another layer covering the co-catalyst is preferably amorphous. This can suppress protons and water molecules from being diffused to the surface of the co-catalyst. This can also suppress hydrogen gas and oxygen gas from moving into the co-catalyst. The thickness of another layer is preferably 1 nm or more to 50 nm or less, and more preferably 2 nm or more to 20 nm or less.

As co-catalysts of the second photocatalyst particles 20, particles composed of one or more selected from the group consisting of metals such as Mn, Fe, Co, Ir, Ru and Ni; or a metal oxide, a metal hydroxide or a metal phosphate obtained by mixing said metals can be preferably used. More preferably, a metal oxide particle or a metal hydroxide particle having one or more selected from Mn, Co and Ru can be used.

The average primary particle diameter of these co-catalysts is preferably less than 10 nm, and more preferably 5 nm or less. When the average primary particle diameter is set to be small, the co-catalysts can effectively function as active sites for hydrogen and oxygen generation reaction, thereby resulting in exhibition of a sufficient function as co-catalysts. When the average primary particle diameter of the co-catalysts is 10 nm or more, the number of active points as water-reduction or oxidation reaction sites per supported weight is decreased, and therefore, there is a possibility that efficient water splitting is suppressed.

A method for supporting the co-catalyst preferably includes an impregnation method, an adsorption method or the like. The impregnation method or the adsorption method is a method in which the photocatalyst particles 10 and 20 are dispersed in a solution dissolved a co-catalyst precursor to adsorb the co-catalyst precursor on the surface of photocatalyst particles 10 and 20. The co-catalyst precursor includes a chloride, a nitrate or an amine salt of metals such as platinum, ruthenium, iridium, rhodium and nickel.

When the co-catalyst precursor is supported on the surface of the photocatalyst particles 10 in a condition that the precursor is metal, the activity is increased. In this case, it is preferable that the co-catalyst precursor is reduced on the surface of the photocatalyst particles 10 and is deposited with a metal contained. Methods for reducing the co-catalyst precursor preferably include a photoreduction method, a chemical reduction method and the like. The photoreduction method is a method in which the co-catalyst precursor adsorbed on the photocatalyst particles 10 is reduced by the excited electrons produced in the photocatalyst particles 10 under ultraviolet light or visible light irradiation to the photocatalyst particles. The chemical reduction method is a method in which the co-catalyst precursor is reduced under hydrogen gas stream at 400° C. or less, preferably 300° C. or less. The co-catalysts supported in such methods have a particle shape. Supporting the co-catalyst on the surface of the first photocatalyst particles 10 can decrease the activation energy in reduction reaction of water, thereby resulting in execution of rapid hydrogen generation.

The amount of the co-catalyst supported on the surface of the photocatalyst particles can be suitably determined so long as light irradiated to the photocatalyst particles is not blocked by the presence of the co-catalyst. The amount of co-catalyst is preferably small.

Specific Structure of Photocatalytic Member

The structure of the photocatalytic member according to the present invention is described by the following embodiments 1-6 as specific examples. The photocatalytic member according to the present invention is not limited to these embodiments.

Embodiment 1

As a specific example of the photocatalytic, member according to the present invention, the photocatalytic member 100 is described with reference to FIG. 1 again. In the photocatalytic member 100, the first photocatalyst particles 10 and the second photocatalyst particles 20 are nearly alternately located on the surface of the base 90 in plane direction (X-Y plane direction) and in thickness direction (Z direction) of the photocatalytic member 100. The first photocatalyst particles 10 and the second photocatalyst particles 20 are high-densely and uniformly located throughout the photocatalytic layer 70. The conductive particles 40 are high-densely and uniformly located between the first photocatalyst particles 10 and the second photocatalyst particles 20 nearly alternately as well as high-densely and uniformly located throughout the photocatalytic layer 70, while being in contact with the first and second photocatalyst particles. In Embodiment 1, at any site, namely first area 40a, of the surface of one conductive particle 40 that is present in a form of a primary particle, the first photocatalyst particle 10 is in contact with the conductive particle 40. At other site, namely second region 40b, of the surface of the same conductive particle 40, the second photocatalyst particle 20 is in contact with the conductive particle 40. That is, the first photocatalyst particle 10 is in contact with the second photocatalyst particle 20 through the same conductive particle 40. The photocatalytic layer 70 has pores 71. The pores 71 are located among the first photocatalyst particles 10, the second photocatalyst particles 20 and the conductive particles 40. The pores 71 can secure contact of water as well as hydrogen and oxygen gases with the respective particles 10, 20 and 40. Therefore, the photocatalytic layer 70 can achieve a relatively high water splitting performance in spite of its layer structure.

In Embodiment 1, since the first photocatalyst particles 10 and the second photocatalyst particles 20 are alternately located in both plane and thickness directions, when the base 90 has a visible light transparency, light can be irradiated from all directions. Therefore, on the entire surface of the photocatalytic layer 70, the first photocatalyst particles 10 and the second photocatalyst particles 20 can effectively absorb light depending on the respective light absorption properties. Furthermore, the second photocatalyst particles 20 or the first photocatalyst particles 10 located in a layer provided adjacently inside the outermost layer can absorb light transmitted without being absorbed by the first photocatalyst particles 10 or the second photocatalyst particles 20 located in the outermost layer. The first photocatalyst particles 10, the second photocatalyst particles 20 and the conductive particles 40 are high-densely and uniformly located throughout the photocatalytic layer 70. Therefore, charge recombination reaction between photoexcited holes produced in the first photocatalyst particles and photoexcited electrons produced in the second photocatalyst particles 20 can promptly or high-efficiently occur through the conductive particles 40. As a result, photolysis of water can be conducted with high efficiency.

On the other hand, in a conventional embodiment in which the first photocatalyst particles 10 and the second photocatalyst particles 20 are dispersed in a dispersion medium, there was a problem regarding the realization of an efficient water splitting reaction. For example, introduction of external energy such as stirring and circulating and others were constantly required for uniformly dispersing the photocatalyst particles in water. Therefore, a method using the dispersion medium is not suitable for an efficient photocatalytic water-splitting reaction device.

A layer structure in which the first photocatalyst particles 10 and the second photocatalyst particles 20 are fixed on a metal sheet has been also suggested. In this case, in order to secure a good coupling formation between the photocatalyst particles and the metal sheet layer, multiple steps of forming the metal sheet layer, etc. by a metal deposition method, a sputtering method, etc. other than forming the photocatalyst particles layer was essential. Furthermore, the layer structure in which the first and second photocatalyst particles 10 and 20 are fixed on a metal sheet was prepared by using a dry film forming method, and therefore, was not suitable for producing a photocatalytic member for splitting water with large area.

In the present invention, the present inventors have first found that the formation of the layer structure of the photocatalytic layer by locating the first and second photocatalyst particles 10 and 20 and the conductive particles 40 as described above can accomplish a high water splitting performance that is practically effective.

Embodiment 2

As a specific example of the photocatalytic member according to the present invention, the photocatalytic member 110 is described with reference to FIG. 6. In the photocatalytic member 110, an intermediate layer 80 is provided on surface of the base 90, and the photocatalytic layer 70 is provided on the intermediate layer. The intermediate layer 80 includes the conductive particles 40.

In Embodiment 2, when light such as sunlight is entered from the upper surface side of the photocatalytic layer 70, the first photocatalyst particles 10 and/or the second photocatalyst particles 20 present in the outermost layer of the photocatalytic layer 70 are first exposed to the light. This allows the first and second photocatalyst particles 10 and 20 to efficiently absorb the light. Furthermore, the first photocatalyst particles 10 are electrically coupled to the second photocatalyst particles 20 through the conductive particles 40 contained in the photocatalytic layer 70 or the conductive particles 40 contained in the intermediate layer 80. Therefore, charge recombination reaction is promoted, as a result, efficient photolysis of water can be conducted.

In Embodiment 2, an example in which the intermediate layer 80 contains the conductive particles 40 is described. The intermediate layer 80 can contain, for example, a non-conductive particle having a small aspect ratio, for example, a non-conductive fine particle of glass frit or inorganic oxide. In this case, the intermediate layer 80 allows the photocatalytic layer 70 to strongly adhere to the base 90. The intermediate layer 80 can also contain particles obtained by combining a plurality of the above particles.

Embodiment 3

As a specific example of the photocatalytic member according to the present invention, the photocatalytic member 120 is described with reference to FIG. 7. In the photocatalytic member 120, the photocatalytic layer 70 and the intermediate layer 80 of Embodiment 1 further include a conductive wire(s) 50. The conductive wire 50 is, for example, a particle having a large aspect ratio and having a rod-like or needle-like form.

In Embodiment 3, for example, the conductive wire 50 having a proper aspect ratio of 5 or more to 1,000 or less is used. Therefore, the possibility is increased that the first photocatalyst particles 10 and the second photocatalyst particles 20 can be simultaneously coupled to each other through one conductive wire or a plurality of conductive wires electrically coupled to one another, compared with the case of using an isotropic conductive particle(s). Therefore, charge recombination reaction is promoted, as a result, photolysis of water can be efficiently conducted. Furthermore, adhesion among the photocatalyst particles 10, 20 and the conductive particles 40 as well as adhesion among these particles 10, 20 and 40 and the base 90 are more improved.

In Embodiment 3, for example, conductive particles and/or non-conductive particles having a small aspect ratio of around 1 or more to 3 or less can be further included together with the conductive wire. Thereby, the particles having a small aspect ratio can be functioned as fillers. Consequently, the mechanical and/or electrical properties of the photocatalytic member 120 can be improved. When the non-conductive particles are used as particles having a small aspect ratio, particles having small absorption of visible light are preferably selected. Thereby, prevention of light absorption of the photocatalyst particles 10 and 20 by the conductive particles 40 can be suppressed.

Embodiment 4

Figure 8:
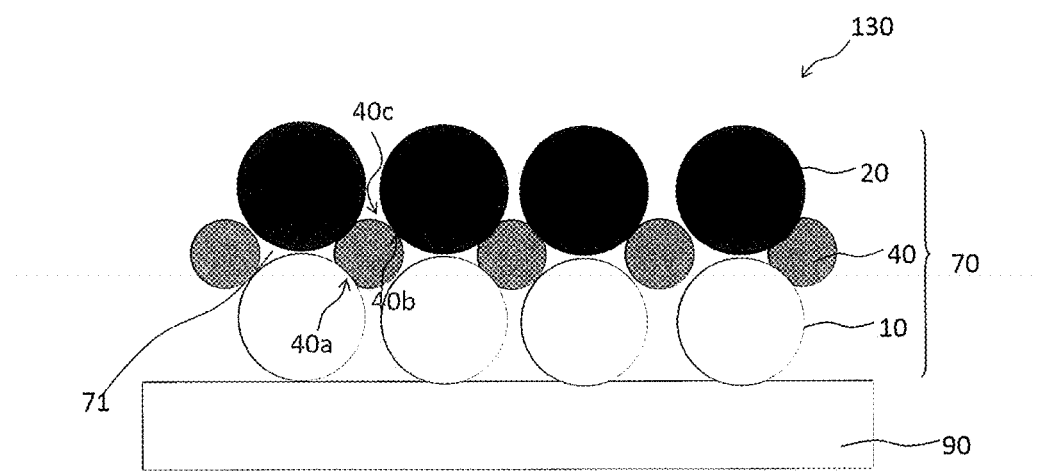
FIG. 8 is a schematic sectional view showing a photocatalytic member according to the present invention.

As a specific example of the photocatalytic member according to the present invention, the photocatalytic member 130 is described with reference to FIG. 8. In the photocatalytic member 130, the photocatalytic layer 70 is provided on the surface of the base 90. In this example, the photocatalytic layer 70 includes three layers. A layer of the first photocatalyst particles 10 is provided on the surface of the base 90. A layer of the second photocatalyst particles 20 is further provided on the layer of the first photocatalyst particles 10. A layer of the conductive particles 40 is located between the layer of the first photocatalyst particles 10 and the layer of the second photocatalyst particles 20. The first photocatalyst particles 10 are electrically coupled to the second photocatalyst particles 20 through the layer of the conductive particles 40.

In Embodiment 4, an efficient light absorption system in consideration of the light absorption properties of the photocatalyst particles 10 and 20 can be provided. Specifically, photocatalyst particles are selected so that a relation of $\lambda 1 > \lambda 2$ can be established between the light absorption edge wavelength $\lambda 1$ of the first photocatalyst particles 10 and the light absorption edge wavelength $\lambda 2$ of the second photocatalyst particles 20. In this case, providing the layer of the second photocatalyst particles 20 on the outermost surface of the photocatalytic member 130 allows the layer of the second photocatalyst particles 20 to absorb light in the short wavelength side. Furthermore, the layer of the first photocatalyst particles 10 provided under the layer of the second photocatalyst particles 20 can absorb light in the long wavelength side unabsorbed in and transmitted from the layer of the second photocatalyst particles 20. Accordingly, a phenomenon that different photocatalyst particles absorb light of the same wavelength can be avoided or suppressed, and therefore, efficient light absorption can be realized depending on the light absorption properties of the respective photocatalyst particles.

In the photocatalytic member 130, the photocatalytic layer 70 is described as an example which has the layer of the first photocatalyst particles 10 and the layer of the second photocatalyst particles 20 laminated in this order on the surface of the base 90. In the photocatalytic layer 70, the layer of the second photocatalyst particles 20 and the layer of the first photocatalyst particles 10 can be laminated in this order on the surface of the base 90. In this case, it is preferable that photocatalyst particles are selected so that a relation of $\lambda 1 < \lambda 2$ can be established between the light absorption edge wavelength $\lambda 1$ of the first photocatalyst particles 10 and the light absorption edge wavelength $\lambda 2$ of the second photocatalyst particles 20.

In the photocatalytic member 130, the intermediate layer 80 can be provided between the photocatalytic layer 70 and the base 90. As the intermediate layer 80, those previously described in the paragraphs regarding the photocatalytic members 110 and 120.

Embodiment 5

As a specific example of the photocatalytic member according to the present invention, the photocatalytic member 104 is described with reference to FIG. 9. The photocatalytic member 104 differs from Embodiment 1 in the form of the conductive particles 40. Namely, in Embodiment 5, for example, a plurality of primary particles or one or more of secondary particles are bound to one another to form the conductive particles 40. In the photocatalytic member 104, for example, a plurality of particles are chemically bound by heating or the like. Thereby, the particles 10, 20 and 40 are bound in a net-like form, and therefore, uniform and dense matrix structure is formed. The photocatalytic member 104 has the same constitution as the photocatalytic member 100 except for a difference in the form of the conductive particles 40. The photocatalytic member 104 can achieve the same relatively-high water splitting performance as the photocatalytic member 100. Moreover, the photocatalytic member 104 can improve adhesion between the photocatalytic layer 70 and the base 90.

Embodiment 6

As a specific example of the photocatalytic member according to the present invention, the photocatalytic member 105 is described with reference to FIG. 10. The photocatalytic member 105 differs from Embodiment 1 in the form of the conductive particles 40. Namely, in Embodiment 5, the conductive particles 40 are composed of so-called secondary particles formed by assembly, association or aggregation of primary particles. Even when the conductive particles 40 are aggregated, the aggregated conductive particles 40 execute the effect of the present invention as long as they allow the first photocatalyst particles 10 to be electrically coupled to the second photocatalyst particles 20. The conductive particles 40 may be in a condition of not only primary particles but also aggregate.

Method for Producing Photocatalytic Member

As a method for producing the photocatalytic member such as 100-105,110,120 or 130 according to the present invention, a method can be used which comprises the step of fixing to the base 90 the photocatalytic layer 70 containing the first photocatalyst particles 10, the second photocatalyst particles 20 and the conductive particles 40 through which the first photocatalyst particles 10 are electrically coupled to the second photocatalyst particles 20 to form the above-mentioned structure.

According to a preferred embodiment of the present invention, as a method for producing the photocatalytic members 100-105 according to the present invention, a method can be used which comprises the steps of applying on the base 90 a dispersion obtained by mixing and wetly dispersing the first photocatalyst particles 10, the second photocatalyst particles 20 and the conductive particles 40 to form a wet film; and drying the wet film. As the dispersion, for example, a pasty one can be used.

A method can be used in which the conductive particles 40 is separately, for example, late added. Specifically, according to another preferred embodiment of the present invention, a method for producing the photocatalytic members 100-105 according to the present invention comprises the steps of applying on the base 90 a dispersion obtained by mixing and wetly dispersing the first photocatalyst particles 10 and the second photocatalyst particles 20 to form a wet film; and drying the wet film to from a photocatalytic film. The method further comprises a step of dropwisely applying a dispersion obtained by wetly dispersing the conductive particles 40 on the photocatalytic film. In this case, while drying, for example, the conductive particles 40 are moved to particle interface between the first and second photocatalyst particles 10 and 20. The photocatalytic members 100-105 are thus obtained.

According to another preferred embodiment of the present invention, a method for producing the photocatalytic members 100-105 according to the present invention comprises the steps of previously supporting the conductive particles 40 on the surface of either the first photocatalyst particles 10 or the second photocatalyst particles 20; applying on the base 90 a dispersion obtained by mixing and wetly dispersing one of either the first photocatalyst particles 10 or the second photocatalyst particles 20 supporting the conductive particles 40 and the other one of either the first photocatalyst particles 10 or the second photocatalyst particles 20 not supporting the conductive particles 40 to form a wet film; and drying the wet film. In this case, as a method for previously supporting the conductive particles 40 on the surface of either the first photocatalyst particles 10 or the second photocatalyst particles 20, the same method as the method for supporting the co-catalyst on the photocatalyst particles, such as an impregnation method, an adsorption method, a photoreduction method, a chemical deposition method or the like, can be used.

In the above two embodiments, glaze fine particles can be further added to the dispersion. By heating the dispersion to which the glaze fine particles are added at, for example, 300° C. or less, the glaze fine particles adhere to the surface of the base 90. Therefore, adhesion of the photocatalytic layer 70 to the base 90 can be improved. Also, the glaze fine particles do not completely cover the surface of the photocatalyst particles 10 and 20, and thus, decrease in the photocatalytic activity of the photocatalytic member can be suppressed.

In the above two embodiments, before applying the dispersion containing the photocatalyst particles, for example, the intermediate layer 80 can be formed. The intermediate layer 80 can be formed by, for example, applying on the base 90 the dispersion containing the conductive particles 40 or non-conductive particles having a small aspect ratio. After forming the intermediate layer 80, the photocatalytic layer 70 can be formed by applying the dispersion containing photocatalyst particles on the intermediate layer. After forming the intermediate layer 80, the photocatalytic layer 70 can be formed by drying the intermediate layer. Alternatively, a photocatalytic film comprising the first photocatalyst particles, the second photocatalyst particles and the conductive particles is formed on a first base, and thereafter, for example, a paste containing the conductive particles is further applied on the photocatalytic film to form a wet film, and thereafter, the wet film is dried and fired to further form a film of conductive particles. Then, a second base provided thereon an adhesive layer such as a carbon tape is pressed on the film of conductive particles to remove the first base. A photocatalytic member thus can be obtained in which the photocatalytic film is formed on the second base through the film of conductive particles as the intermediate layer.

According to yet another preferred embodiment of the present invention, in a method for producing the photocatalytic member 130 according to the present invention, a dispersion obtained by wetly dispersing the first photocatalyst particles 10, a dispersion obtained by wetly dispersing the conductive particles 40, and a dispersion obtained by wetly dispersing the second photocatalyst particles 20 are independently prepared. Then, the respective dispersions can be alternately applied on the base 90 by so-called an alternate adsorption method and thereafter can be dried. Thereby, the photocatalytic layer 70 can be formed in which the first photocatalyst particles 10, the conductive particles 40 and the second photocatalyst particles 20 are, for example, alternately laminated in this order on the surface of the base 90. As a method for alternately applying the respective dispersions, for example, a method for immersing the base 90 in the respective dispersions can be used.

In the present embodiment, a dispersion obtained by wetly dispersing glaze fine particles therein can be further prepared. For example, the glaze dispersion is initially applied on the base 90 and dried to form the photocatalytic layer 70 in which layers of glaze fine particles, the first photocatalyst particles 10, the conductive particles 40 and the second photocatalyst particles 20 are, for example, alternately laminated in this order on the surface of the base 90. By forming the layer of glaze particles on the surface of the base 90, adhesion of the photocatalytic layer 70 to the base 90 can be improved.

In the present invention, as a method for dispersing the first photocatalyst particles 10, the second photocatalyst particles 20 and the conductive particles 40 in a liquid medium, a method for adsorbing a solvent such as water or an organic solvent or a dispersant on the surfaces of the respective first photocatalyst particles 10, the second photocatalyst particles 20 and the conductive particles 40 can be preferably used. Thereby, a condition that the respective particles are approximately in a form of primary particles and are stably mixed can be realized. Namely, aggregation among the first photocatalyst particles 10, the second photocatalyst particles 20 or the conductive particles 40 can be suppressed. Accordingly, in the photocatalytic layer 70, the first photocatalyst particles 10 can be close to the second photocatalyst particles 20 through the conductive particles 40. Therefore, water splitting reaction can be promoted, and hydrogen generation efficiency can be increased.

In the present invention, as wet dispersion methods, mechanical dispersion methods such as ultrasonic irradiation, a ball mill and a bead mill can be preferably used.

In the present invention, as the liquid medium, a solvent capable of dispersing the first photocatalyst particles 10, the second photocatalyst particles 20 and the conductive particles 40 can be used. According to a preferred embodiment of the present invention, as a solvent like this, water; or an organic solvent such as ethanol; or an organic vehicle solvent such as α-terpineol can be used. In order to improve dispersibility of the first photocatalyst particles 10, the second photocatalyst particles 20 and the conductive particles 40 in the solvent, a dispersant can be added to the solvent.

In the present invention, as a method for applying the dispersion on the base 90, a spin coating method, dip coating method, a spraying method, a doctor blade coating method, an electrophoresis method, a screen printing method or the like can be preferably used. The applying method may be appropriately selected depending on the shape and type of the base 90.

In the present invention, the preferred range of the thickness of the photocatalytic layer 70 can be calculated in consideration of light absorption coefficient of the photocatalytic member used. The thickness of the photocatalytic layer 70 can be set, for example, within the range of 0.1 µm to 50 µm.

In order to achieve a desirable layer thickness, a forming method of the photocatalytic layer 70 can be appropriately selected. For example, to obtain a photocatalytic layer 70 having a thickness of 1 µm or less, a spin coating method, a dip coating method, a spraying method or the like is preferably used. To obtain a photocatalytic layer 70 having a thickness of 1 µm or more, a screen printing method, a doctor blade coating method, an electrophoretic method or the like is preferably used.

According to a preferred embodiment of the present invention, a method for dispersing the first photocatalyst particles 10 and second photocatalyst particles 20 in the liquid medium comprises the step of dispersing the first photocatalyst particles 10 and second photocatalyst particles 20, respectively, for example, in a solution containing polymers having different charges such as an anionic polymer and a cationic polymer to be approximately in a condition of monodispersion in which the particles are dispersed in a form of a primary particle. Coulomb interaction between the different charges of the polymers adsorbed on the surface of the respective photocatalyst particles 10 and 20 by mixing the resulting dispersion allows the first photocatalyst particles 10 and second photocatalyst particles 20 to be voluntarily adsorbed to each other, and therefore, to be close to or to be in contact with each other. For example, the first photocatalyst particles 10 are dispersed in a solution containing an anionic polymer, and the second photocatalyst particles 20 are dispersed in a solution containing a cationic polymer. Then, by mixing these dispersions, a condition that primary particles are close to or in contact with one another with high density can be realized. Then, by heating or firing the photocatalyst particles in a condition that primary particles are close to or in contact with one another with high density to remove the polymers, a highly active condition as a visible light responsive photocatalytic member for splitting water can be realized.

In the present invention, the first photocatalyst particles 10, the second photocatalyst particles 20 and the conductive particles 40 are fixed on the base 90 by drying a dispersion containing these particles, preferably by drying the dispersion and firing a dried product. The firing temperature is preferably the thermal decomposition temperature of a solvent or a dispersant etc. or more The firing temperature is more preferably a temperature at which firing between the base 90 and the first photocatalyst particles 10, the second photocatalyst particles 20 or the conductive particles 40; between the conductive particles 40 and the first photocatalyst particles 10 or the second photocatalyst particles 20; or among the first photocatalyst particles 10, the second photocatalyst particles 20 or the conductive particles 40 can be promoted. Specifically, the firing temperature is preferably 100° C. or higher to 700° C. or lower, more preferably 200° C. or higher to 600° C. or lower, still more preferably 300° C. or higher to 400° C. or lower. By firing at any temperature within the above range, the visible light responsive photocatalytic member for splitting water having high adhesion to the base 90 and high adhesion among the particles 10, 20 or 40 and having stability for a long period of time can be obtained. The firing atmosphere can be any atmosphere of an air, a nitrogen, or a reducing gas such as ammonia or hydrogen. An air or a nitrogen atmosphere is preferable. Thus, disappearance of the binder during firing efficiently occur. In firing under a nitrogen atmosphere, oxidation of the conductive particles can be suppressed. Therefore, decrease in the conductivity of the conductive particles can be suppressed.

Mixing Ratio

In the method for producing the photocatalytic member according to the present invention, the mixing ratio by weight of the first photocatalyst particles and the second photocatalyst particles, represented by the first photocatalyst particles: the second photocatalyst particles, is preferably 10:90 to 90:10, and more preferably 20:80 to 80:20. By mixing in this range, charge recombination reaction on the interfaces of the particles can be promoted. As a result, water splitting efficiency of the photocatalytic member can be increased.

Photocatalytic Module for Splitting Water

The photocatalytic module for splitting water according to the present invention comprises the photocatalytic member previously described. In a preferred embodiment of the present invention, the photocatalytic module for splitting water according to the present invention has a nearly transparent light incident surface and is structured such that light is incident on a photocatalytic member disposed within the module. In addition, the photocatalytic module has a sealed panel configuration for containing water so that the photocatalytic member can be always in contact with water. In a more preferred embodiment of the present invention, the photocatalytic module for splitting water according to the present invention further comprises a mechanism such as a water passing hole through which water, the amount of which is reduced with the progress of the water-splitting reaction, is successively added and supplied. The photocatalytic module for splitting water having the above construction allows commercially available production of hydrogen.

Hydrogen Production System

The hydrogen production system according to the present invention comprises the photocatalytic module for splitting water. In a preferred embodiment of the present invention, the hydrogen production system according to the present invention comprises a water supply apparatus, a filtration apparatus for removing impurities contained in water to some extent, a photocatalytic module for splitting water, a hydrogen separation apparatus, and a hydrogen storage apparatus. The hydrogen production system having the above construction allows production of hydrogen from sunlight and water as a renewable energy source.

EXAMPLES

The present invention is described in more detail by the following examples. The present invention is not limited to these examples.

Material

The first photocatalyst particles, the second photocatalyst particles and the conductive particles used as the raw materials are described.

Preparation of First Photocatalyst Particles

Preparation of the First Photocatalyst Particles 1-1, 3% Rh-Doped $SrTiO_3$ Particles 3% Rh-doped $SrTiO_3$ ($SrTi_{0.97}Rh_{0.30}O_3$) particles were prepared by solid-phase reaction method. Specifically, $SrCO_3$ (manufactured by Wako Pure Chemical Industries, Ltd., 99.9%), $TiO_2$ (manufactured by Kojundo Chemical Laboratory Co., Ltd, 99.99%), and $Rh_2O_3$ (Wako Pure Chemical Industries, Ltd.) were put in an alumina mortar at a molar ratio of 1.05:0.97:0.03, followed by adding methanol to the mortar and mixing them for 2 hours. Then, the resulting mixture was put in an alumina crucible, calcined at 900° C. for 1 hour, and fired at 1050° C. for 10 hours. After firing, the fired body was statically cooled to room temperature and pulverized to prepare a powder of 3% Rh-doped $SrTiO_3$ ($SrTi_{0.97}Rh_{0.03}O_3$) particles.

Preparation of the First Photocatalyst Particles 1-2, 4% La and 4% Rh-Doped $SrTiO_3$ Particles First, a strontium carbonate powder (manufactured by Kanto Chemical Co., Inc., purity 99.9%, the powder being previously fired at 200° C. for 1 hour) and a rutile-type titanium oxide powder (manufactured by Kanto Chemical Co., Inc., purity 99.0%) were mixed in a mortar at a molar ratio of Sr:Ti=1.05:1, and the mixture was fired at 1150° C. for 10 hours to obtain a powder of $SrTiO_3$. Next, the powder of $SrTiO_3$ thus obtained, a lanthanum oxide powder, and rhodium oxide ($Rh_2O_3$, purity 99.9%) were mixed in ethanol at a molar ratio of Sr:La=0.96:0.04, and Ti:Rh=0.96:0.04. A powder obtained by drying the mixture was fired at 1100° C. for hours to prepare a powder of 4% La and 4% Rh-doped $SrTiO_3$ ($Sr_{0.96}La_{0.04}Ti_{0.96}Rh_{0.04}O_3$) particles. As a lanthanum oxide powder ($La_2O_3$), a powder was used that was obtained by previously firing a powder manufactured by Kanto Chemical Co., Inc. having a purity of 99.9% at 1000° C. for 10 hour.

Average Primary Particle Diameter

The average primary particle diameter of 3% Rh-doped $SrTiO_3$ particles, the first photocatalyst particles 1-1, and 4% La and 4% Rh-doped $SrTiO_3$ particles, the first photocatalyst particles 1-2 was calculated by a SEM observation. Specifically, an average value obtained by circle approximation of 50 crystal particles in an observation under a SEM (manufactured by Hitachi, Ltd., S-4100) at a magnification of 40,000 times was set as the primary particle diameter. As a result, the average primary particle diameter of 3% Rh-doped $SrTiO_3$ particles, and 4% La and 4% Rh-doped $SrTiO_3$ was about 500 nm and about 300 nm, respectively.

Band Structure

The band position of 3% Rh-doped $SrTiO_3$ particles as well as 4% La and 4% Rh-doped $SrTiO_3$ particles was estimated with reference to Wang et al., J. Catal. 305-315, 328 (2015) as follows:

the upper end of the valence band: −6.6 eV (vs. vacuum level)

the bottom end of the conduction band: −4.1 eV (vs. vacuum level)

The upper end of the valence band in 3% Rh-doped $SrTiO_3$ particles as well as 4% La and 4% Rh-doped $SrTiO_3$ particles is considered to be derived from the upper end of the donor orbital derived from the dopant, $Rh^{3+}$ generated in the bandgap of $SrTiO_3$.

Preparation of Second Photocatalyst Particles

Preparation of the Second Photocatalyst Particles 2-1, $BiVO_4$ Particles Supporting $CoO_x$ $BiVO_4$ particles supporting $CoO_x$ were prepared by liquid-solid phase reaction method. Specifically, first, $K_2CO_3$ (manufactured by Kanto Chemical Co., Inc., 99.5%) and $V_2O_5$ (manufactured by Wako Pure Chemical Industries, 99.0%) were put in an agate mortar at a molar ratio of K:V=3.03:5, followed by adding ethanol (10 ml) to the mortar and mixing them for 30 minutes. Then, the resulting mixture was put in a porcelain crucible and fired in air at 450° C. for 5 hours in an electric furnace. After firing, the fired body was statically cooled to room temperature and pulverized.

The resulting powder was put in a 300 mL Erlenmeyer flask containing 100 ml of water and $Bi(NO_3)_3 \cdot 5H_2O$ (Wako, 99.9%) (Bi:V=1:1), and the mixture was stirred at 1500 rpm with a stirrer at 70° C. for 10 hours. The resulting precipitate was collected by suction filtration, washed with water, and dried at 60° C. for 12 hours with a dryer to obtain a $BiVO_4$ powder.

0.5 g of the $BiVO_4$ powder obtained was put in a porcelain crucible, and $Co(NO_3)_2$ (Wako, 99.5%) was further put in the porcelain crucible so that the amount of CoO as a raw material of a co-catalyst is set to be 0.5 wt %. A small amount of pure water was yet further put in the porcelain crucible. The $BiVO_4$ powder was thoroughly suspended by ultrasonic waves, and then, was subject to an evaporative drying in a hot-water bath. Finally, the dried product was fired in air at 300° C. for 2 hours in an electric furnace. Consequently, a powder of $BiVO_4$ particles carrying $CoO_x$ as a co-catalyst for oxygen generation was prepared.

Preparation of the Second Photocatalyst Particles 2-2, 0.5% Mo-Doped $BiVO_4$ Particles Supporting $CoO_x$ 0.5% Mo-doped $BiVO_4$ particles supporting $CoO_x$ were prepared by solid-phase reaction method. Specifically, first, $Bi(NO_3)_3$ (manufactured by Wako Pure Chemical Industries, 99.9%), $V_2O_5$ (manufactured by Wako Pure Chemical Industries, 99.0%) and $MoO_3$ (manufactured by Kanto Chemical Co., Inc., 99.5%) were put in an agate mortar at a molar ratio of Bi:V:Mo=1:4.975:0.025, followed by adding ethanol (10 mL) to the mortar and mixing them for 30 minutes. Then, the resulting mixture was put in a porcelain crucible and fired in air at 600° C. for 5 hours in an electric furnace. After firing, the fired body was statically cooled to room temperature to prepare a powder of 0.5% Mo-doped $BiVO_4$ particles.

0.5 g of the 0.5%-Mo doped $BiVO_4$ powder obtained was put in a porcelain crucible, and $Co(NO_3)_2$ (Wako, 99.5%) was further put in the porcelain crucible so that the amount of CoO as a raw material of a co-catalyst is set to be 0.5 wt %. A small amount of pure water was yet further put in the porcelain crucible. The $BiVO_4$ powder was thoroughly suspended by ultrasonic waves, and then, was subject to an evaporative drying in a hot-water bath. Finally, the dried product was fired in air at 300° C. for 2 hours in an electric furnace. Consequently, a powder of 0.5% Mo-doped $BiVO_4$ particles carrying $CoO_x$ as a co-catalyst for oxygen generation was prepared.

Preparation of the Second Photocatalyst Particles 2-3, 0.05% Mo-Doped $BiVO_4$ Particles 0.05% Mo-doped BiVO4 particles were prepared by liquid-solid phase reaction method in the same way as the second photocatalyst particles 2-1: $BiVO_4$ particles supporting $CoO_x$ were prepared. Specifically, first, $K_2CO_3$ (manufactured by Kanto Chemical Co., Inc., 99.5%), $V_2O_5$ (manufactured by Wako Pure Chemical Industries, 99.0%) and $MoO_3$ (manufactured by Kanto Chemical Co., Inc., 99.5%) were put in an agate mortar at a molar ratio of K:V Mo=3.03:4.9975:0.0025, followed by adding ethanol (10 ml) to the mortar and mixing them for 30 minutes. Then, the resulting mixture was put in a porcelain crucible and fired in air at 450° C. for 5 hours in an electric furnace. After firing, the fired body was statically cooled to room temperature and pulverized.

The resulting powder was put in a 300 mL Erlenmeyer flask containing 100 ml of water and $Bi(NO_3)_3 \cdot 5H_2O$ (Wako, 99.9%) (Bi:(V+Mo)=1:1), and the mixture was stirred at 1500 rpm with a stirrer at 70° C. for 10 hours. The resulting precipitate was collected by suction filtration, washed with water, and dried at 60° C. for 12 hours with a dryer to obtain a 0.05% Mo-doped $BiVO_4$ powder.

Preparation of the Second Photocatalyst Particles 2-4, $Ta_3N_5$ Particles 1.0 g of $Ta_2O_5$ powder (manufactured by Rare Metallic) was fired at 850° C. for 20 hours in an ammonia gas stream (flow rate: 300 mL/min) using a tube furnace to obtain $Ta_3N_5$ particles.

Average Primary Particle Diameter

By a SEM observation, the average primary particle diameter of $BiVO_4$ particle supporting $CoO_x$ (second photocatalyst particles 2-1), 0.5% Mo-doped $BiVO_4$ particle supporting $CoO_x$ (second photocatalyst particles 2-2), 0.05% Mo-doped $BiVO_4$ particle (second photocatalyst particles 2-3) and $Ta_3N_5$ particles (second photocatalyst particles 2-4) was calculated. As a result, the average primary particle diameter is about 500 nm, about 500 nm, about 800 nm, and about 300 nm, respectively.

Band Structure

The band position of $BiVO_4$ particles was estimated with reference to Wang et al., J. Catal. 305-315, 328 (2015) as follows:

the upper end of the valence band: −6.8 eV (vs. vacuum level)

the bottom end of the conduction band: −4.6 eV (vs. vacuum level)

The band position of $Ta_3N_5$ particles was estimated with reference to J. Phys. Chem. B, 2003, 107(8), 1798-1803 as follows:

the upper end of the valence band: −5.96 eV (vs. vacuum level)

the bottom end of the conduction band: −3.86 eV (vs. vacuum level)

Preparation of Conductive Particles

Conductive Particles 1

10 wt % of gold colloid dispersion in ethanol (manufactured by Shinkou Kagaku Kogyosho Co., Ltd.) was used. The average primary particle diameter of the gold colloid particles was 20 nm. The average primary particle diameter is a value described in a catalog as the value calculated by a TEM observation. As for the electronic properties of the gold colloid particles, the work function was 5.1 eV and the Fermi level was −5.1 eV (vs. vacuum level) (see, A. Sharma et al., Applied Physics letters, 93, 163308 (2008)).

Conductive Particles 2

10 wt % of ITO colloid (10% Sn-doped $In_2O_3$) dispersion paste in an organic solvent (Okuno Chemical Industries Co., Ltd.) was used. The average primary particle diameter of the ITO colloid particles was 10 nm. The average primary particle diameter is a value described in a catalog as the value calculated by a TEM observation. As for the electronic properties of the ITO colloid particles, the work function was 4.6 eV and the Fermi level was −4.6 eV (vs. vacuum level) (see, A. Sharma et al., Applied Physics letters, 93, 163308 (2008)).

Conductive Particles 3

$RuO_2$ particles (Shoei Chemical Inc.) were used. The average primary particle diameter of the $RuO_2$ particles was 40 nm. As for the electronic properties of the $RuO_2$ particles, the work function was 5.0 eV and the Fermi level was 5.0 eV (vs. vacuum level) (see, D. J. Yun et al., ACS Appl. Mater. Interfaces, 4, 4588-4594 (2012)).

Conductive Particles 4

Ketjen black was used as carbon particles. The average primary particle diameter of the carbon particles was 40 nm. As for the electronic properties of the carbon particles, the work function was 5 eV and the Fermi level was −5.0 eV (vs. vacuum level.) (Source: JP 2003-017331 A).

Raw materials used are shown in Table 1.

TABLE 1

| | | co-catalyst | average particle diameter (nm) |
|---|---|---|---|
| first photocatalyst particles 1-1 | 3% Rh-doped $SrTiO_3$ | none | 500 |
| first photocatalyst particles 1-2 | 4% La and 4% Rh-doped $SrTiO_3$ | none | 300 |
| second photocatalyst particles 2-1 | $BiVO_4$ | CoOx | 500 |
| second photocatalyst particles 2-2 | 0.5% Mo-doped $BiVO_4$ | CoOx | 500 |
| second photocatalyst particles 2-3 | 0.05% Mo-doped $BiVO_4$ | none | 800 |
| second photocatalyst particles 2-4 | $Ta_3N_5$ | none | 300 |
| conductive particles 1 | Au colloid | — | 20 |
| conductive particles 2 | ITO colloid | — | 10 |
| conductive particles 3 | $RuO_2$ | — | 40 |
| conductive particles 4 | carbon | — | 40 |

Production of Photocatalytic Member

Preparation of Coating Pastes 1-33

The first photocatalyst particles (1-1 or 1-2) and the second photocatalyst particles (2-1, 2-2, 2-3 or 2-4) were weighed in the ratio shown in Table 2 to be in a total amount of 0.25 g. The weighed photocatalyst particles were mixed with 0.75 g of an organic dispersion medium and dispersed in the medium. As the organic dispersion medium, a medium obtained by mixing α-terpineol (manufactured by Kanto Chemical Co., Inc.), 2-(2-butoxyethoxy)ethanol (manufactured by Wako Pure Chemical Industries) and a polyacrylic resin (SFB-TE1, manufactured by Soken Chemical & Engineering Co. Ltd.) at a weight ratio of 62.5:12.5:25.0 in this order was used. Then, the conductive particles (1, 2, 3 or 4) were added in the ratio shown in Table 2 to prepare coating pastes 1-3, 5-12, 14-17, 19-29, 31 and 32 having the total solid content of the first photocatalyst particles and the second photocatalyst particles and the conductive particles equal to 25 wt %. The conductive particles were not added to coating pastes 4, 13, 18, 30 and 33.

Production of Photocatalytic Members 1-30 and 33-35

The coating pastes 1-33 were coated on the base (synthetic quartz glass, size: 5 cm×5 cm×thickness 1 cm) by a screen printing method so that the coating thickness is 60 μm and the coating area is 6.25 cm² (2.5 cm square). Thereafter, the coating pastes 1-2, 5-8, 19-23 and 26-29 containing the conductive particles 1 (gold colloid particles) were dried at 80° C. for 30 minutes and fired at 300° C. or 400° C. for 30 minutes to produce the photocatalytic members 1-2, 5-8, 19-23 and 26-29. The coating pastes 3, 9-12, 14-17, 24 and 32 containing the conductive particles 2 (ITO colloid particles) were dried at 80° C. for 30 minutes and fired at 300° C. or 400° C. for 30 minutes to produce the photocatalytic members 3, 9-12, 14-17, 24 and 34. The coating paste 25 containing the conductive particles 3 ($RuO_2$ particles) was dried at 80° C. for 30 minutes and fired at 300° C. for 30 minutes to produce the photocatalytic member 25. The coating paste 31 containing the conductive particles 4 (carbon) was dried at 80° C. for 30 minutes and fired at 300° C. for 30 minutes to produce the photocatalytic member 33. The coating pastes 4, 13, 18, 30 and 33 not containing any conductive particles was dried at 80° C. for 30 minutes and fired at 300° C. for 30 minutes to produce the photocatalytic members 4, 13, 18, 30 and 35. The thickness of the photocatalytic layer of the respective photocatalytic members after firing was 10 μm.

As the conductive particles 1 (gold colloid particles), those having the average particle diameter of 20 nm were used. On the other hand, for example, when the content of the conductive particles 1 is more than a predetermined amount, the conductive particles 40, when applied on the base 90, are likely to be present in an aggregated form. Therefore, when the photocatalytic layer 70 is formed by heating, these conductive particles 40 are bound to one another. For example, in the photocatalytic member 8 having the content of the conductive particles 40 equal to 50 wt %, the conductive particles 40 are bound to one another, and thus, the particle diameter of the conductive particles 40 in the photocatalytic layer becomes around 200 nm.

The photocatalytic members 1-3, 5-7, 9-12, 14-17, 19-20, 24, 26, 27, 33 and 34 have a structure corresponding to the photocatalytic member 100 shown in FIG. 1.

In the photocatalytic members 8, 21-23, 28 and 29, a plurality of conductive particles 40 are bound to one another, the particle diameter of the conductive particles in the photocatalytic layer is larger than the particle diameter of the conductive particles in the paste. The photocatalytic members 8, 21-23, 28 and 29 have a structure corresponding to the photocatalytic member 104 shown in FIG. 9. In these photocatalytic members, the conductive particles are bound to the first and second photocatalyst particles, and the photocatalytic layer 70 has a mesh-like structure.

The photocatalytic member 25 has a structure corresponding to the photocatalytic member 105 shown in FIG. 10. In the photocatalytic member 25, the conductive particles 40 which are in an aggregated condition are coupled to the first photocatalyst particles 10 and the second photocatalyst particles 20.

Production of Photocatalytic Member 31

The paste 18 was coated on the base, dried at 80° C. for 30 minutes, and fired at 300° C. for 30 minutes to obtain a photocatalytic film. Then, to the photocatalyst film, the conductive particles 1 were dividedly added 5 times and dropwisely so that the amount of gold colloid particles is 2% by weight when the total amount of the first photocatalyst particles and the second photocatalyst particles is 100% by weight to obtain a photocatalyst film containing gold colloid particles. The photocatalyst film containing gold colloid particles was dried at room temperature for 10 minutes and further at 80° C. for 30 minutes, and fired at 300° C. for 30 minutes to produce the photocatalytic member 31. The photocatalytic member 31 has a structure corresponding to the photocatalytic member 100 shown in FIG. 1.

Production of Photocatalytic Member 32

The paste 18 was coated on the base. Then, a paste having an amount of gold colloid particles equal to 100% by weight was prepared, and the paste containing gold colloid particles was further coated on the surface of the base coated with the paste 18. The resulting product was dried at room temperature for 10 minutes and further at 80° C. for 30 minutes, and fired at 300° C. for 30 minutes to prepare a film having a photocatalytic film covered with gold colloid film on the surface of the base. A glass base with a carbon tape attached thereto was prepared. By pressing the glass base to the photocatalyst film so that the carbon tape on the glass base is in contact with the surface of the photocatalyst film, the photocatalyst film was peeled off from the base. By transferring the photocatalyst film to the glass base with the carbon tape attached thereto and forming a photocatalytic layer, the photocatalytic member 32 was produced.

The photocatalytic member 32 has a structure in which on the glass base, through the carbon tape, the gold colloid film and the photocatalytic film are laminated in this order. The photocatalytic member 32 has a structure corresponding to a structure in which an intermediate layer 80 is further provided between the base 90 and the photocatalytic layer 70 in the photocatalytic member 104 shown in FIG. 9. In the photocatalytic member 32, the glass base, the gold colloid film, and the photocatalytic film correspond to the base 90, the intermediate layer 80, and the photocatalytic layer 70, respectively.

Production of Photocatalytic Members 36-49 Having a Covering Portion(s)
Preparation of Coating Pastes The first photocatalyst particles (1-1) and the second photocatalyst particles (2-3) are weighed to be in a total amount of 0.25 g. The weighed photocatalyst particles were mixed with 0.75 g of an organic dispersion medium and dispersed in the medium. As the organic dispersion medium, a medium obtained by mixing α-terpineol (manufactured by Kanto Chemical Co., Inc.), 2-(2-butoxyethoxy)ethanol (manufactured by Wako Pure Chemical Industries) and a polyacrylic resin (SPB-TE1, manufactured by Soken Chemical & Engineering Co. Ltd.) at a weight ratio of 62.5:12.5:25.0 in this order was used. Then, the conductive particles (1, 2 or 4) were added to prepare three types of coating pastes having the total solid content of the first photocatalyst particles and the second photocatalyst particles and the conductive particles equal to 25 wt %. Specifically, the weight percentage of the first photocatalyst particles (1-1), the second photocatalyst particles (2-3) and the conductive particles 1 or 2 contained in the paste is 40 wt %, 40 wt % and 20 wt %, respectively, in this order. The weight percentage of the first photocatalyst particles (1-1), the second photocatalyst particles (2-3) and the conductive particles 4 contained in the paste is 47.5 wt %, 47.5 wt % and 5 wt %, respectively, in this order.

Production of Photocatalytic Members 36-49

The three types of coating pastes were coated on the base (synthetic quartz glass, size: 5 cm×5 cm×thickness 1 cm) by a screen printing method so that the coating thickness is 60 μm and the coating area is 6.25 cm² (2.5 cm square). Thereafter, the coating pastes containing the conductive particles 1 (gold colloid particles) were dried at 80° C. for 30 minutes and fired at 300° C. for 30 minutes to produce the photocatalytic members 36-45. The coating pastes containing the conductive particles 2 (ITO colloid particles) were dried at 80° C. for 30 minutes and fired at 400° C. for 30 minutes to produce the photocatalytic members 46 and 47. The coating pastes containing the conductive particles 4 (carbon) were dried at 80° C. for 30 minutes and fired at 300° C. for 30 minutes to produce the photocatalytic members 48 and 49. The thickness of the photocatalytic layer after firing was 10 μm.

Production of Photocatalytic Members 36-49 Having a Covering Portion(s)

A covering portion(s) was formed for the photocatalytic members 36-44, 46 and 48 using the materials shown in Table 3. Locating the covering portion in the photocatalytic members was conducted according to the following procedures. First, in the photocatalytic members 38-43, 50 μL to 200 μL of alcoholic solution dissolved 20 mM of metal monomer as shown in Table 3 (alkoxide, chloride or nitrate) was dropwisely added thoroughly on the surface of the photocatalytic layers. In the photocatalytic members 36 and 37, 50 μL to 200 μL of alcoholic dispersion dispersed 0.4 wt % of metal oxide colloid was dropwisely added thoroughly on the surface of the photocatalytic layers. Then, by during at 100° C. for 30 minutes, a covering portion was formed on the surface of the photocatalytic layer. Locating the covering portion in the photocatalytic member 44 as shown in Table 3 was conducted according to the following procedures. The photocatalytic member was immersed in 3 mL of toluene solution dissolved 20 mM of 3-mercaptopropyltriethoxysilane at room temperature for 3 hours to adsorb the silane compound generally in a form of monolayer on the surface of the conductive fine particles. Thereafter, the photocatalytic member was pulled out of the solution, washed with toluene five times, and dried at 120° C. for 30 minutes to form a covering portion(s) on the surface of the conductive fine particles. In the photocatalytic members 45, 47 and 49, a covering portion(s) was not formed.

In the photocatalytic member 36, as diiron trioxide ($Fe_2O_3$) colloidal sol, a mixed solution of water and ethanol of α-$Fe_2O_3$ colloid having an average primary particle diameter of about 10 nm (solid content: 0.4 wt %) was used.

In the photocatalytic member 37, as cerium oxide ($CeO_2$) sol, a mixed solution of water and ethanol of $CeO_2$ colloid having an average primary particle diameter of about 8 nm (solid content: 0.4 wt %) was used.

Evaluation
Structure of Photocatalytic Layer

Figure 11:
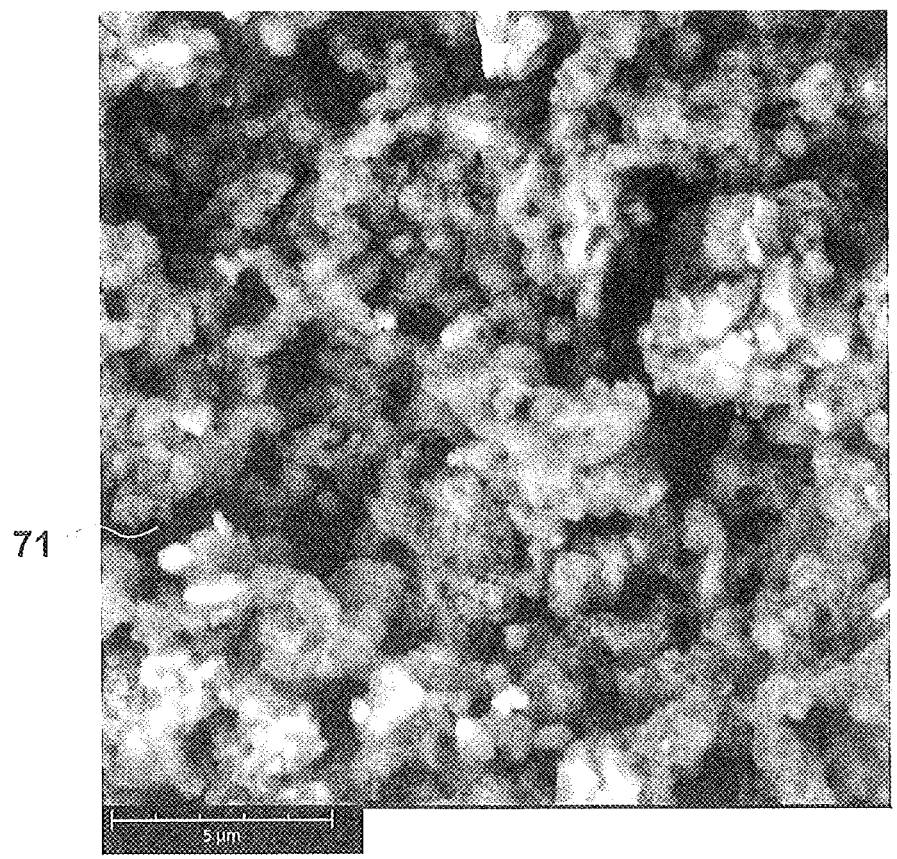
FIG. 11 is a SEM image of the photocatalytic layer of the photocatalytic member 3.
Figure 12:
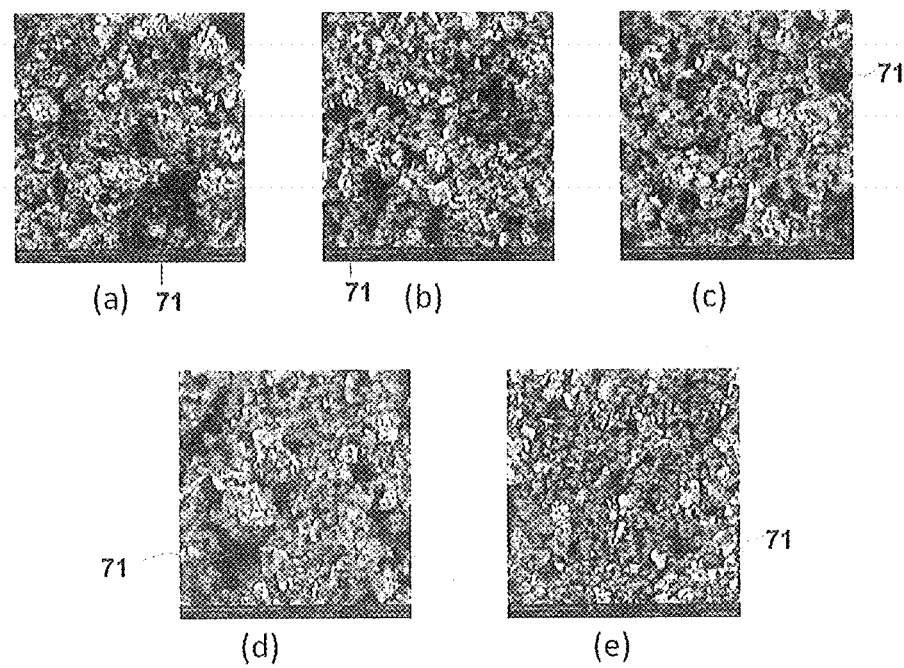
FIG. 12 is a SEM image of a photocatalytic layer of a photocatalytic member according to the present invention.
Figure 13:
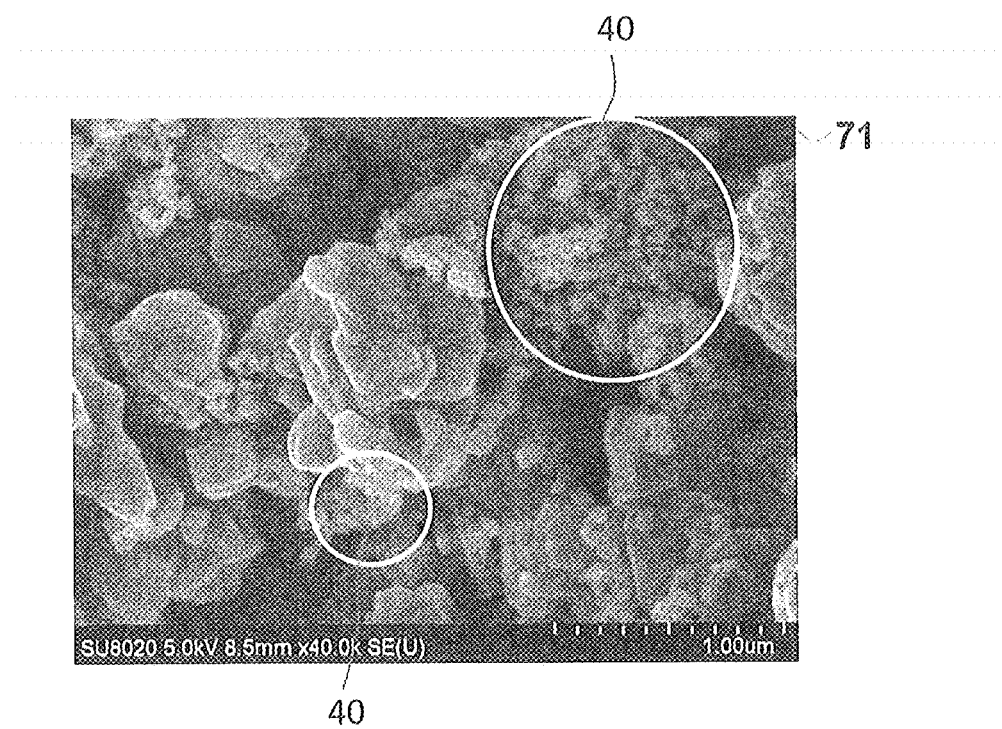
FIG. 13 is a SEM image of a photocatalytic layer of a photocatalytic member according to the present invention.

The structure of the photocatalytic layer in the respective photocatalytic members produced was observed by a SEM. The results are shown in FIGS. 11 to 13. FIG. 11 is a surface observation image of the photocatalytic layer 70 in the photocatalytic member 3. FIG. 12(a) to FIG. 12(e) are surface observation images of the photocatalytic layers 70 in the photocatalytic members 14 to 18. FIG. 13 is a surface observation image of the photocatalytic layer 70 in the photocatalytic member 25. The surface observation image is an image in observing a plane perpendicular to the lamination direction (Z axis direction) that is a direction from the base to the photocatalytic layer 70.

As shown in FIGS. 11-13, it was confirmed that the photocatalytic layer 70 has pores 71. It was also confirmed that, in the photocatalytic layer 70 of the respective photocatalytic members 3, 14-17 and 25, the first photocatalyst particles 10 and the second photocatalyst particles 20 are in physical contact with the conductive particles 40. It was further confirmed that, as shown in FIG. 13, in the photocatalytic member 25, the conductive particles 40 are aggregated. As described later, in the photocatalytic member 25, the conductive particles 40 are aggregated, but a good water-splitting activity was obtained.

Photocatalytic Activity, i.e., Water-Splitting Activity, of Photocatalytic Member Next, the photocatalytic activity, i.e., water-splitting activity, of the photocatalytic members 1 to 35 produced under visible light irradiation was evaluated by the following method. The photocatalytic member and 100 ml of ultrapure water were put into a glass flask with a Pyrex (registered trademark) window for upper part irradiation to prepare a reaction solution. The glass flask containing the reaction solution was mounted on a closed circulation device (manufactured by Makuhari rikagaku garasu Inc.) and the atmosphere in the reaction system was purged with argon. Argon pressure was 90 torr. Visible light by a 300 W xenon lamp (manufactured by Cermax, PE-300BF) equipped with a UV cutoff filter (L-42, manufactured by HOYA) was irradiated to the photocatalytic member through a Pyrex (registered trademark) window. The amount of hydrogen and oxygen each generated by reduction and oxidation of water was measured over time for 3 hours after light irradiation by using a gas chromatograph (manufactured by Shimadzu Seisakusho Ltd., GC-8A, TCD detector, MS-5A column). The results were shown in Table 2. Regarding only the photocatalytic member 29, the photocatalytic activity thereof was evaluated using AM 1.5G simulated solar light as a light source.

Test Using the First Photocatalyst Particles 1-1 and Second Photocatalyst Particles 2-1

Figure 14:
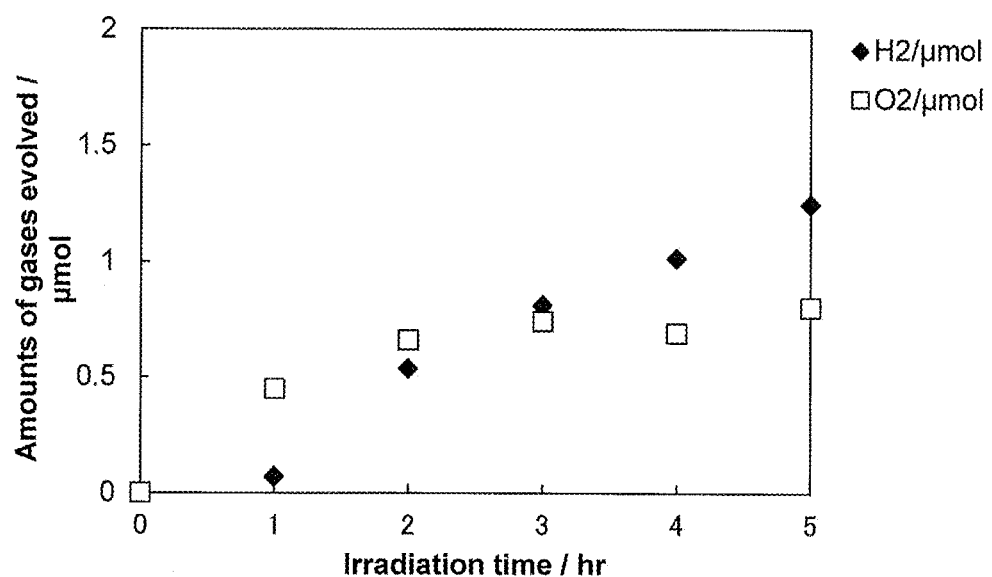
FIG. 14 is a graph showing the relationship between the photocatalytic member 1 and gas evolution efficiency.
Figure 15:
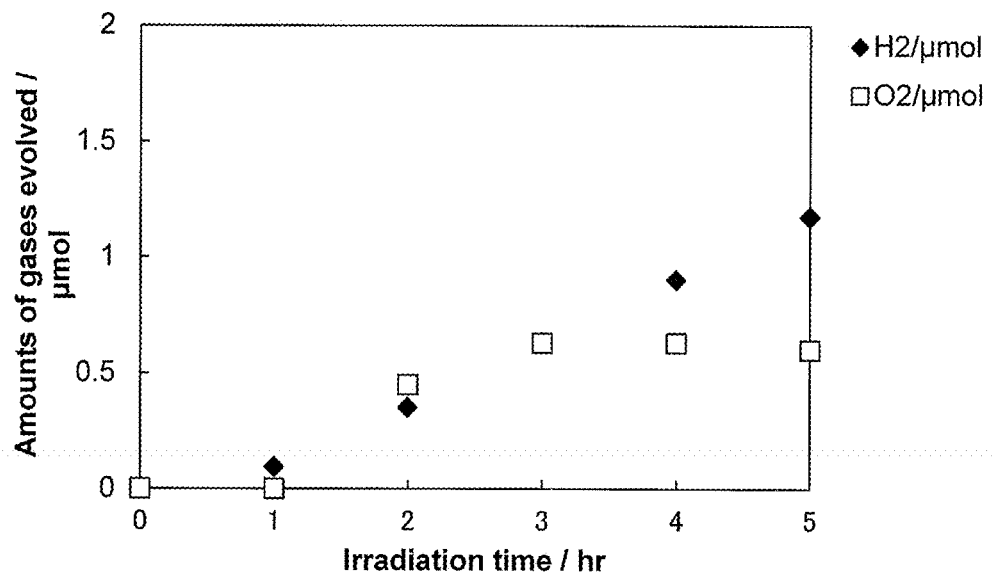
FIG. 15 is a graph showing the relationship between the photocatalytic member 2 and gas evolution efficiency.
Figure 16:
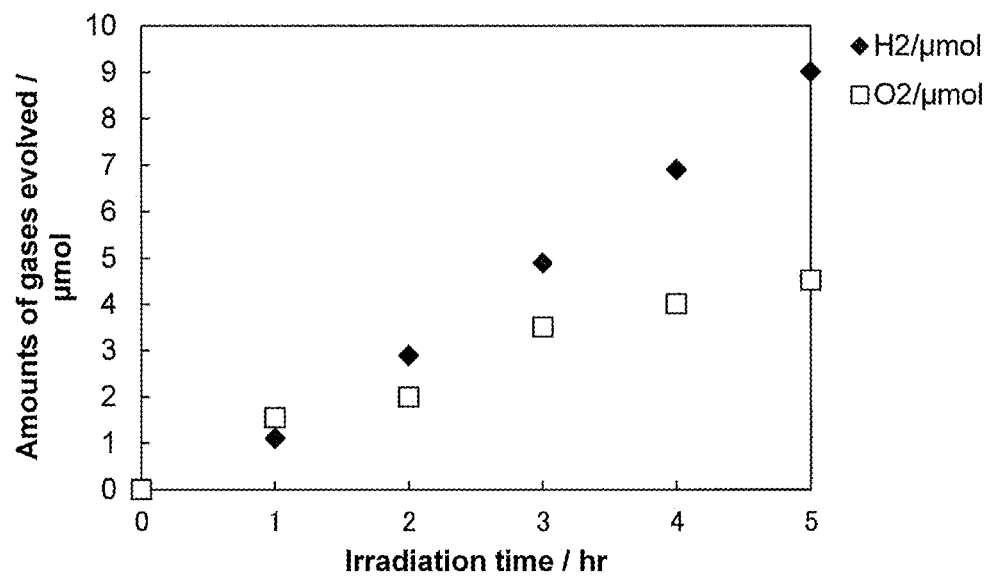
FIG. 16 is a graph showing the relationship between the photocatalytic member 3 and gas evolution efficiency.
Figure 17:
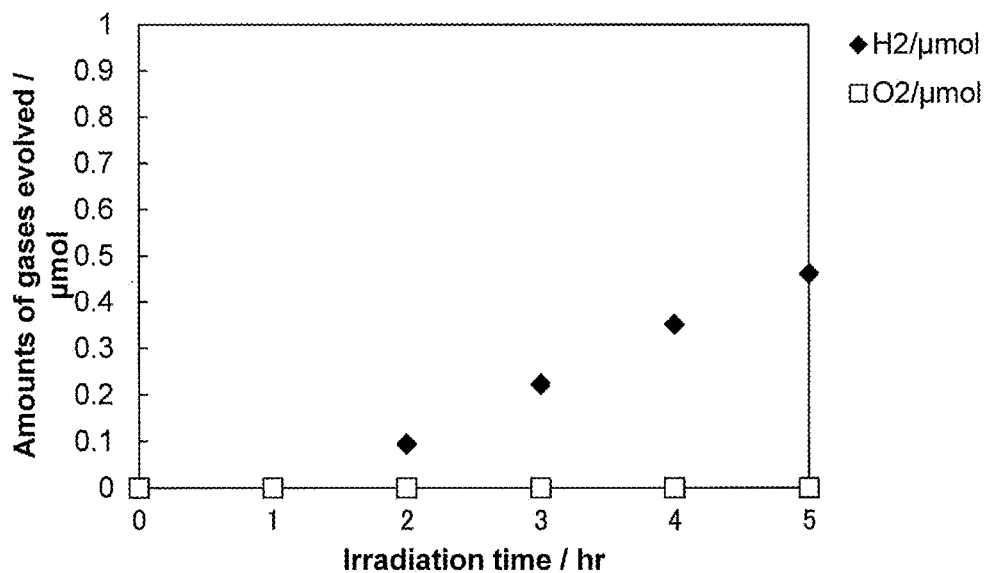
FIG. 17 is a graph showing the relationship between the photocatalytic member 4 and gas evolution efficiency.

The relationship between the photocatalytic members 1-4 and hydrogen and oxygen evolution efficiencies, i.e., generation rates, is shown in FIGS. 14-17. As shown in FIG. 17, in the photocatalytic member 4 containing no conductive particles, oxygen generation was not confirmed. Also, as shown in Table 2, hydrogen generation rate was as low as 0.09 μmol/hr. In contrast, as shown in FIGS. 14-16, in the photocatalytic members 1-3 containing conductive particles, it was confirmed that oxygen and hydrogen generation rates are remarkably increased. Regarding particularly hydrogen generation rate, the hydrogen generation rates of the photocatalytic members 1 and 2 containing gold colloid particles as the conductive particles were about 2 to 3 times as high as that of the photocatalytic member 4. It was also confirmed that the hydrogen generation rate of the photocatalytic member 3 containing ITO colloid particles as the conductive particles is 20 times as high as that of the photocatalytic member 4. It was further confirmed that, from the comparison of the photocatalytic member 4 and the photocatalytic member 3, ITO does not become a co-catalyst for hydrogen generation, but has a function as a conductive particle in the present invention, and significantly improve the hydrogen generation performance of the photocatalytic member.

Figure 18:
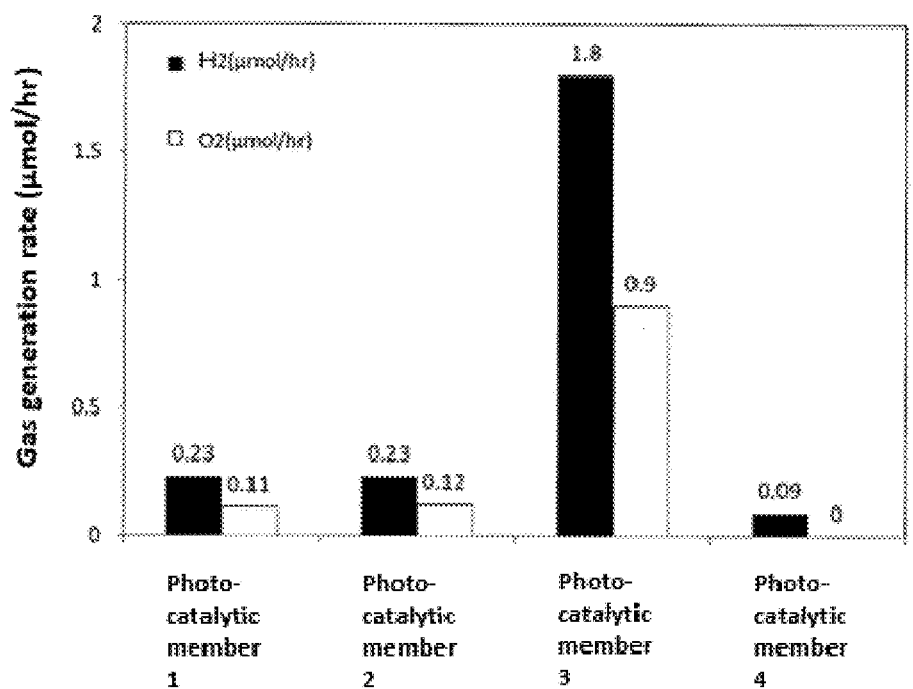
FIG. 18 is a graph showing the generation rate of hydrogen gas and oxygen gas in the photocatalytic members 1-4.

Gases generation rates in the respective photocatalytic members 1-4 are shown in FIG. 18. As also shown in Table 2, FIGS. 14 and 15, in the photocatalytic members 1 and 2 using Au colloid as the conductive particles, hydrogen gas generation rate was as high as 0.23 μmol/hr, and oxygen gas generation rate was as high as 0.11 to 0.12 μmol/hr. In the photocatalytic member 3 using ITO colloid particles, both hydrogen gas generation rate and oxygen gas generation rate were very high. The conductive particles 1 used in the photocatalytic members 1 and 2 are gold colloid, and the conductive particles 2 used in the photocatalytic member 3 are ITO. The specific gravity of ITO is smaller than that of Au. Therefore, for example, in the photocatalytic members 1 and 3, the weight ratios of the conductive particles contained in the photocatalytic layers are both 20 wt %, while the volume ratio of the conductive particles in the photocatalytic member 3 is more than that in the photocatalytic member 1.

Figure 19:
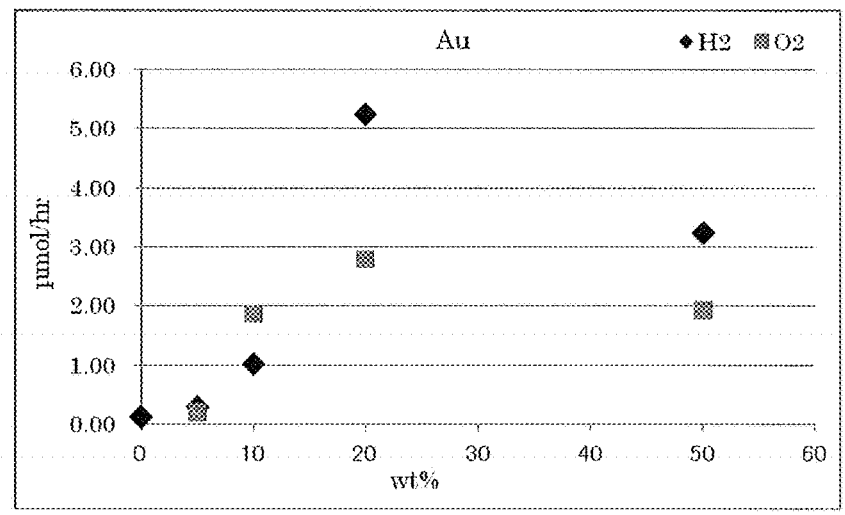
FIG. 19 is a graph showing gas evolution efficiency in the photocatalytic members 5-8, and 13.

Test (i) Using the First Photocatalyst Particles 1-1 and Second Photocatalyst Particles 2-2_Au Colloid Particles Hydrogen and oxygen evolution efficiencies of the photocatalytic members 5-8 and 13 having different amounts of the conductive particles 1 are shown in FIG. 19. FIG. 19 indicates the photocatalytic member 13 containing no conductive particles and the photocatalytic members 5-8 each containing 5, 10, 20, 50 wt % of the conductive particles 1 (Au colloid particles), in this order from the left.

In the photocatalytic member 13 containing no conductive particles, as also shown in Table 2, oxygen generation was not confirmed. Further, hydrogen generation rate was as low as 0.12 μmol/hr.

In contrast, it was confirmed that, in the photocatalytic members 5-8 containing Au colloid particles as the conductive particles, oxygen and hydrogen generation rates are increased dramatically. Hydrogen generation rates of the photocatalytic members 5-8 were about 2.5 times to about 27 times as high as that of the photocatalytic member 13. In the photocatalytic member 8 having an amount of the conductive particles 1 equal to 50%, the amount of the conductive particles is numerous, and therefore, the conductive particles are considered to be bound to one another in the photocatalytic layer. In the photocatalytic members 5-8, the photocatalytic member 7 having an amount of Au colloid particles equal to 20 wt % had the highest water splitting performance.

Figure 20:
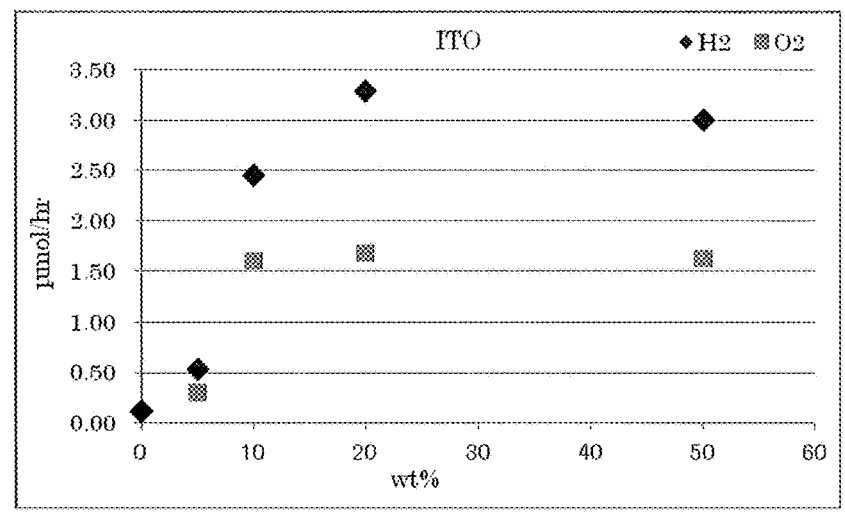
FIG. 20 is a graph showing gas evolution efficiency in the photocatalytic members 9-13.

Test (ii) Using the First Photocatalyst Particles 1-1 and Second Photocatalyst Particle 2-2_ITO Colloid Particles Hydrogen and oxygen evolution efficiencies of the photocatalytic members 9-12 and 13 having different amounts of the conductive particles 2 are shown in FIG. 20. FIG. 20 indicates the photocatalytic member 13 containing no conductive particles and the photocatalytic members 9-12 each containing 5, 10, 20, 50 wt % of the conductive particles 2 (ITO colloid particles), in this order from the left.

It was confirmed that, in the photocatalytic members 9-12 containing ITO colloid particles as the conductive particles, oxygen and hydrogen generation rates are increased dramatically. Hydrogen generation rates of the photocatalytic members 9-12 were confirmed to be about 4 times to about 44 times as high as that of the photocatalytic member 13. In the photocatalytic members 9-12, the photocatalytic member 11 having an amount of ITO colloid particles equal to 20 wt % had the highest water splitting performance, while the photocatalytic members having an amount of ITO colloid particles equal to or more than 20 wt % had similar water splitting performances.

From Table 2, FIGS. 19 and 20, it was confirmed that the addition of the conductive particles to the photocatalytic layer containing 3% Rh-doped $SrTiO_3$ particles as the first photocatalyst particles and $BiVO_4$ particles supporting $CoO_x$ as the second photocatalyst particles can dramatically improve the photocatalytic activity. It is considered that, since the oxygen and hydrogen generation rates were varied depending on the amount of the conductive particles added, by optimizing the amount of the conductive particles added, the balance between the improvement of conductivity and the reduction of the size of pores enabling gas diffusion can be harmonized and the photocatalytic activity can be optimized.

Figure 21:
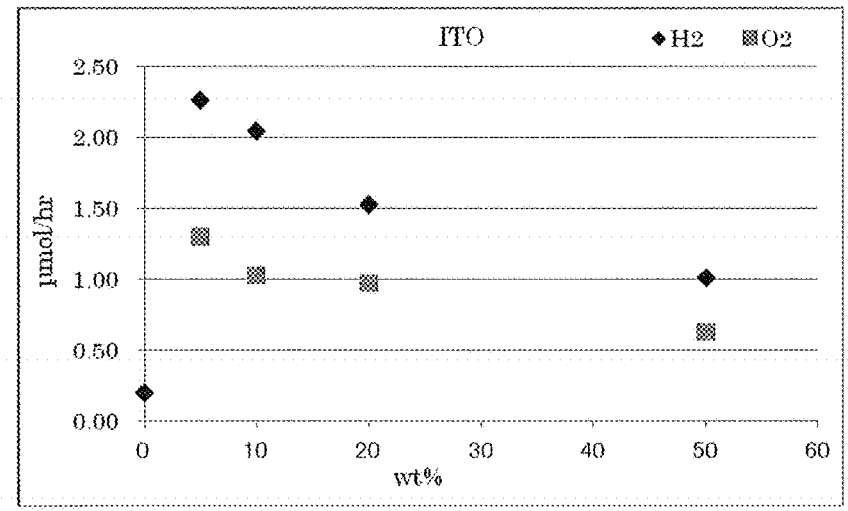
FIG. 21 is a graph showing gas evolution efficiency in the photocatalytic members 14-18.

Test (i) Using the First Photocatalyst Particles 1-1 and Second Photocatalyst Particles 2-3_ITO Colloid Particles Hydrogen and oxygen evolution efficiencies of the photocatalytic members 14-18 having different amounts of the conductive particles 2 are shown in FIG. 21. FIG. 21 indicates the photocatalytic member 18 containing no conductive particles and the photocatalytic members 14-17 each containing 5, 10, 20, 50 wt % of the conductive particles 2 (ITO colloid particles), in this order from the left.

In the photocatalytic member 18 containing no conductive particles, as also shown in Table 2, oxygen generation was not confirmed. Further, hydrogen generation rate was as low as 0.20 μmol/hr.

In contrast, it was confirmed that, in the photocatalytic members 14-17 containing Au colloid particles as the conductive particles, oxygen and hydrogen generation rates are increased dramatically. Hydrogen generation rates of the photocatalytic members 14-17 were about 5 times to about 11 times as high as that of the photocatalytic member 18.

As described above, the hydrogen generation rates of the photocatalytic members 14-17 were much higher than that of the photocatalytic member 18, and the oxygen and hydrogen generation rates were varied depending on the amount of the conductive particles added. Further, as shown in FIG. 12(d), the present inventors have confirmed by experiments that there are interspaces in the photocatalytic layer of the photocatalytic member 17. In view of the above, It is considered that, by optimizing the amount of the conductive particles added, the balance between the improvement of conductivity and the reduction of the size of pores enabling gas diffusion can be harmonized and the photocatalytic activity can be optimized.

Test (ii) Using the First Photocatalyst Particles 1-1 and Second Photocatalyst Particles 2-3_Carbon Hydrogen and oxygen evolution efficiencies of the photocatalytic member 33 containing the conductive particles 4 (carbon) are shown in Table 2. It was confirmed that the oxygen and hydrogen generation rates of the photocatalytic member 33 containing carbon as the conductive particles are more increased than those of the photocatalytic member 18 containing no conductive particles. Hydrogen generation rate of the photocatalytic member 33 was about 4 times as high as that of the photocatalytic member 18.

Test Using the First Photocatalyst Particles 1-2 and Second Photocatalyst Particles 2-3_Au Colloid Particle (i)

Figure 22:
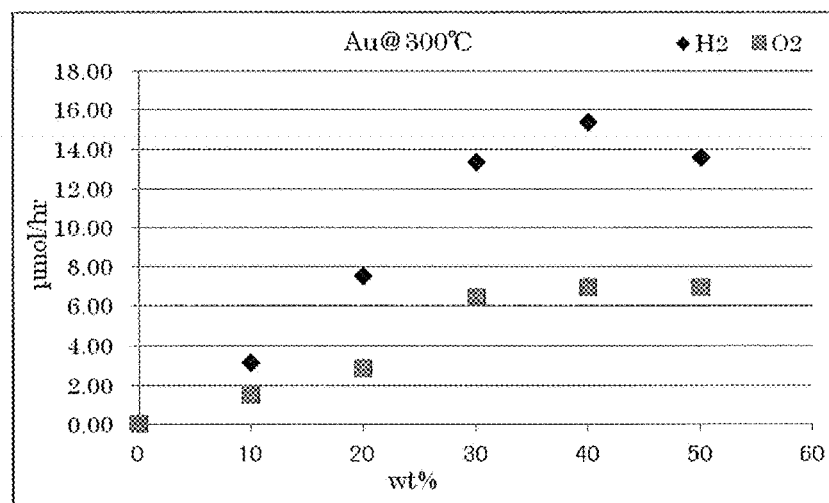
FIG. 22 is a graph showing gas evolution efficiency in the photocatalytic members 19-23, and 30.

Hydrogen and oxygen evolution efficiencies of the photocatalytic members 19-23 and 30 having different amounts of the conductive particles 1 are shown in FIG. 22. FIG. 22 indicates the photocatalytic member 30 produced at firing temperature of 300° C. and containing no conductive particles, and the photocatalytic members 19-23 each containing 10, 20, 30, 40, 50 wt % of the conductive particles 1 (Au colloid particles), in this order from the left.

In the photocatalytic member 30 containing no conductive particles, as shown in Table 2, oxygen generation rate was as low as 0.04 μmol/hr, and hydrogen generation rate was as low as 0.05 μmol/hr.

In contrast, it was confirmed that, in the photocatalytic members 19-23 containing Au colloid particles as the conductive particles, oxygen and hydrogen generation rates are increased dramatically. It was confirmed that hydrogen generation rates of the photocatalytic members 19-23 are about 63 times to about 308 times as high as that of the photocatalytic member 30. Also, the photocatalytic members 19-23, when the content of the Au colloid particles was 40 wt %, had the highest gases evolution rates. Moreover, it is considered that, since the oxygen and hydrogen generation rates were varied depending on the amount of the conductive particles added, by optimizing the amount of the conductive particles added, the balance between the improvement of conductivity and the reduction of the size of pores enabling gas diffusion can be harmonized and the photocatalytic activity can be optimized. In the photocatalytic members 21-23 having an amount of the conductive particles equal to 30 wt % or more, a plurality of the conductive particles were bound to one another in the photocatalytic layer 70.

Test Using the First Photocatalyst Particles 1-2 and Second Photocatalyst Particles 2-3_Au Colloid Particle (ii)

Figure 23:
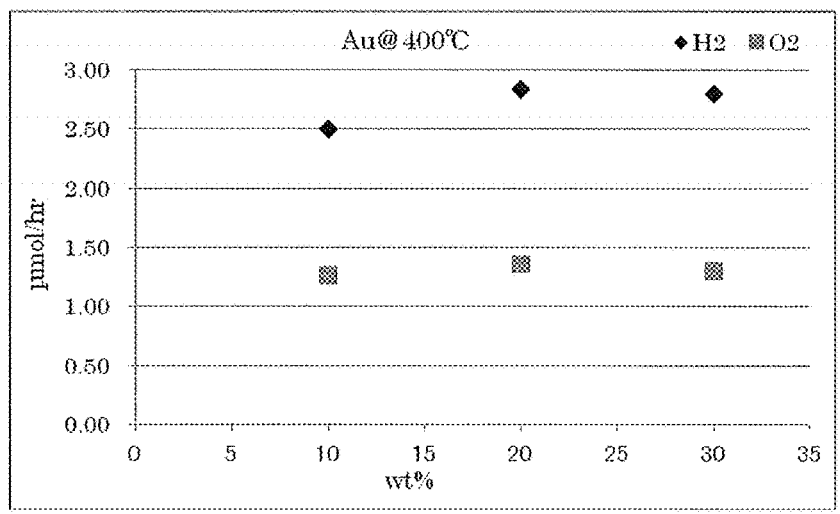
FIG. 23 is a graph showing gas evolution efficiency in the photocatalytic members 26-28.

Hydrogen and oxygen evolution efficiencies of the photocatalytic members 26-28 having different amounts of the conductive particles 1 are shown in FIG. 23. FIG. 23 indicates the photocatalytic members 26-28 produced at firing temperature of 400° C. and containing the conductive particles 1 (Au colloid particles), in this order from the left.

It was confirmed that, in the photocatalytic members 26-28 containing Au colloid particles as the conductive particles, the oxygen and hydrogen generation rates are increased dramatically. It was also confirmed that the hydrogen generation rates of the photocatalytic members 26-28 are about 50 times to about 57 times as high as that of the photocatalytic member 30.

Figure 24:
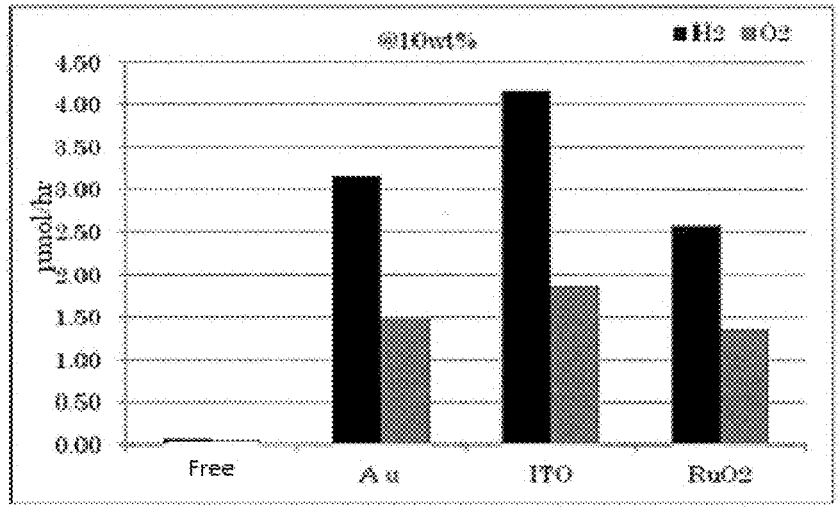
FIG. 24 is a graph showing gas evolution efficiency in the photocatalytic members 19, 24, 25 and 30.

Test Using the First Photocatalyst Particle 1-2 and Second Photocatalyst Particles 2-3_Various Conductive Particles Hydrogen and oxygen evolution efficiencies of the photocatalytic members 19, 24, 25 and 30 having different types of the conductive particles are shown in FIG. 24. FIG. 24 indicates the photocatalytic members 30 containing no conductive particles and the photocatalytic members 19, 24 and 25 each containing 10 wt % of Au colloid particles, ITO colloid particles and $RuO_2$ colloid particles as the conductive particles, in this order from the left.

From Table 2 and FIG. 24, it was confirmed that the photocatalytic members 19, 24 and 25 each obtained by adding different types of the conductive particles to the photocatalytic layer containing 4% La and 4% Rh-doped $SrTiO_3$ particles as the first photocatalyst particles and 0.05% Mo-doped $BiVO_4$ particles as the second photocatalyst particles have a dramatically-improved photocatalytic activity in comparison with the photocatalytic member 30 containing no conductive particles.

Figure 25:
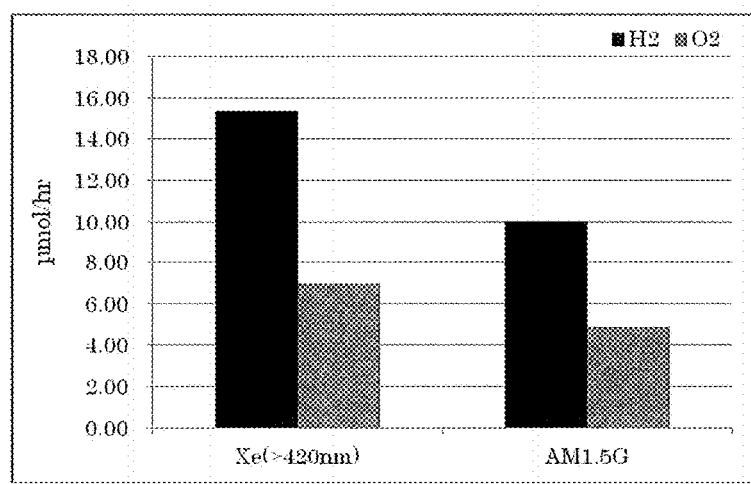
FIG. 25 is a graph showing gas evolution efficiency in the photocatalytic members 22 and 29.

Test Using the First Photocatalyst Particles 1-2 and Second Photocatalyst Particles 2-3_Various Light Sources Gases evolution efficiencies of the photocatalytic members 22 and 29 irradiated with different light sources are shown in FIG. 25. FIG. 25 indicates the photocatalytic member 22 irradiated with a xenon lamp and the photocatalytic member 29 irradiated with AM 1.5 simulated solar light, in this order from the left.

From Table 2 and FIG. 25, it was confirmed that the photocatalytic members 22 and 29 containing the first photocatalyst particles, second photocatalyst particles and conductive particles, regardless of the type of light source, have dramatically-increased oxygen and hydrogen generation rates in comparison with the photocatalytic member 30 containing no conductive particles. Hydrogen generation rates of the photocatalytic members 22 and 29 were each confirmed to be about 308 times and about 200 times as high as that of the photocatalytic member 30.

Test Using the First Photocatalyst Particles 1-2 and Second Photocatalyst Particles 2-3_the Conductive Particles Late Added (i)

As shown in Table 2, it was confirmed that even the photocatalytic member 31 obtained by further adding the conductive particles 1 in a later step to the photocatalytic member 18 containing no conductive particles expresses an approximately 17 times higher photocatalytic activity than the photocatalytic member 18.

Test Using the First Photocatalyst Particles 1-2 and Second Photocatalyst Particles 2-3_the Conductive Particles Late Added (ii)

As shown in Table 2, it was confirmed that even the photocatalytic member 32 in which a layer containing the conductive particles is formed as an intermediate layer between the base and the photocatalytic layer of the photocatalytic member 18 containing no conductive particles expresses an approximately 3 times higher photocatalytic activity than the photocatalytic member 18.

Test Using the First Photocatalyst Particles 1-1 and Second Photocatalyst Particles 2-4_ITO Colloid Particles Hydrogen and oxygen evolution efficiencies of photocatalytic members 34 containing ITO as the conductive particles and the photocatalytic member 35 containing no conductive particles are shown in Table 2. In the photocatalytic member 35 containing no conductive particles, generation of neither hydrogen nor oxygen was confirmed. On the other hand, in the photocatalytic member 34 containing the conductive particles, generation of both hydrogen and oxygen was confirmed.

In view of the above, it was confirmed that the photocatalytic members comprising the first photocatalyst particles, second photocatalyst particles and conductive particles through which the first photocatalyst particles are coupled to the second photocatalyst particles have very excellent oxygen and hydrogen evolution efficiencies, i.e., a photocatalytic activity.

Test of Photocatalytic Member Having a Covering Portion(s) Structure

The structures of the respective photocatalytic members produced were observed. The photocatalytic members 36 and 37 had the structure of the embodiment shown in FIG. 3. The photocatalytic members 38-43 had the structure of the embodiment shown in FIG. 4. The photocatalytic member 44 had the structure of the embodiment shown in FIG. 5. The thicknesses of the respective photocatalytic members produced were shown in Table 3.

Photocatalytic activity, i.e., water-splitting activity, of photocatalytic member The relationship between the material of the covering portion(s) and hydrogen generation activity or reverse reaction preventing rate based on hydrogen generation rate Test for confirming the reverse reaction preventing effect was conducted as follows. First, hydrogen and oxygen evolution rates were measured under reduced pressure so that reverse reaction can be unlikely to occur. Thereafter, the pressure was increased to half normal pressure, and hydrogen and oxygen evolution rates were measured under an atmosphere that reverse reaction can occur. The reduced pressure atmosphere was set to be 80 torr, and half normal pressure atmosphere was set to be 380 torr. Then, as shown in the following formula, the percentage of the generation rate under half normal pressure (380 torr) relative to the generation rate under reduced pressure (80 torr) was calculated as a reverse reaction preventing rate (%). Namely, when the reverse reaction is perfectly prevented by the formation of a covering portion(s), hydrogen and oxygen evolution rates under both the reduced pressure and the half normal pressure are the same value, and the reverse reaction preventing rate is 100%.

Reverse reaction preventing rate (%)=generation rate under half normal pressure (380 torr)/generation rate under reduced pressure (80 torr)×100

Figure 26:
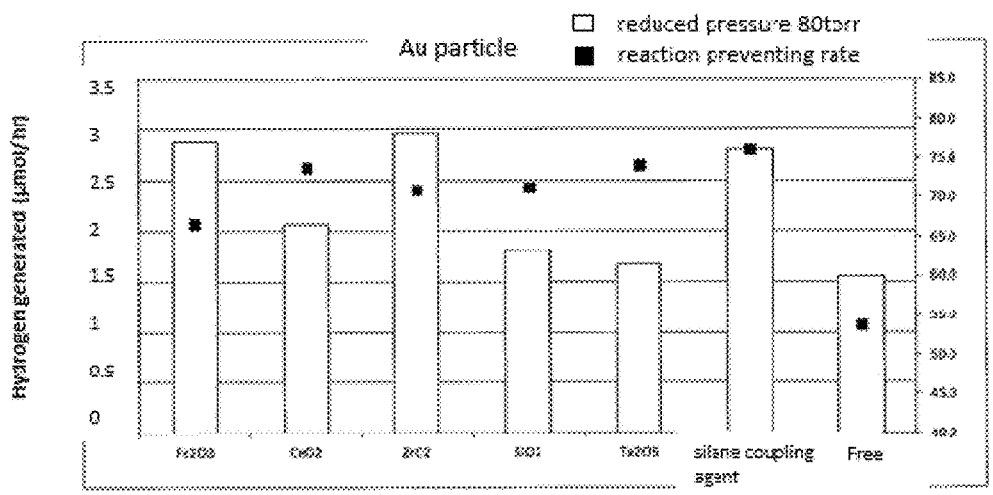
FIG. 26 is a diagram showing the relationship between material of covering portion and reverse reaction preventing rate based on hydrogen generation rate, in the photocatalytic members 36-46.

The hydrogen generation rate (μmol/hr) under reduced pressure (80 torr), the hydrogen generation rate (μmol/hr) under half normal pressure (380 torr), and the reverse reaction preventing rate (%) of a plurality of the photocatalytic members commonly containing Au colloid particles as the conductive particles and having covering portion of different materials are shown in Table 3. The relationship between the material of the covering portion and the reverse reaction preventing rate based on the hydrogen generation rate is shown in FIG. 26. It was confirmed that any of the photocatalytic members 36-44 exhibit a higher reverse reaction preventing rate than the photocatalytic member 45 having no covering portion. It was also confirmed that when diiron trioxide ($Fe_2O_3$), silica ($SiO_2$), zirconium oxide ($ZrO_2$), tantalum oxide ($Ta_2O_5$), cerium oxide ($CeO_2$) or a silane coupling agent (3-mercaptopropyltriethoxysilane) was used as the covering portion, a reverse reaction preventing effect on the surface of Au particles can be obtained. The reverse reaction preventing rates of the photocatalytic members 37-43 were as high as 70%. Among them, the reverse reaction preventing rate of the photocatalytic member 40 was as high as more than 80%. It was thus confirmed that when zirconium oxide ($ZrO_2$) is used as a material of the covering portion, a high reverse reaction preventing rate can be obtained. It was further confirmed that the photocatalytic members 36, 38 and 39 have a higher hydrogen generation rate under reduced pressure than the photocatalytic member 45, and originally have an excellent hydrogen generation performance. Since reverse reaction is unlikely to occur under reduced pressure, a high hydrogen generation rate under reduced pressure is considered to suggest that the photocatalytic members originally have an excellent hydrogen generation performance, which is of great value. In view of the above, it was confirmed that when diiron trioxide ($Fe_2O_3$) and zirconium oxide ($ZrO_2$) are used as materials of the covering portion, a high reverse reaction preventing effect can be obtained, and therefore, a high hydrogen generation performance can be obtained.

Figure 27:
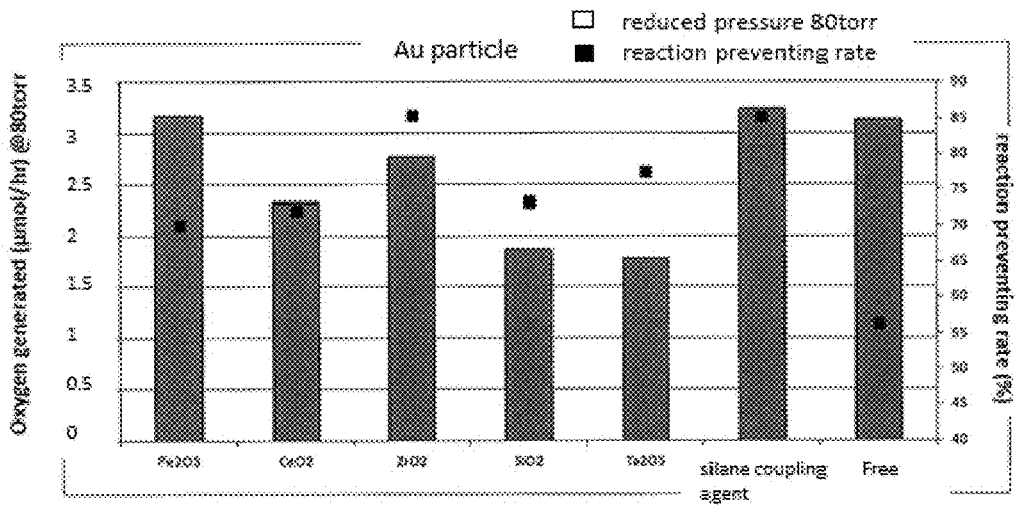
FIG. 27 is a diagram showing the relationship between material of covering portion and reverse reaction preventing rate based on oxygen generation rate, in the photocatalytic members 36-46.

The relationship between the material of the covering portion(s) and oxygen generation activity or reverse reaction preventing rate based on oxygen generation rate The oxygen generation rate (μmol/hr) under reduced pressure (80 torr), the oxygen generation rate (μmol/hr) under half normal pressure (380 torr), and the reverse reaction preventing rate (%) of a plurality of the photocatalytic members commonly containing Au colloid particles as the conductive particles and having covering portion of different materials were measured in the same method as the previously-described evaluation method of the hydrogen generation activity. The results are shown in Table 3. The relationship between the material of the covering portion and the reverse reaction preventing rate based on the hydrogen generation rate is shown in FIG. 27. It was confirmed that any of the photocatalytic members 36-44 exhibit a higher reverse reaction preventing rate than the photocatalytic member 45 having no covering portion. It was also confirmed that when diiron trioxide ($Fe_2O_3$), silica ($SiO_2$), zirconium oxide ($ZrO_2$), tantalum oxide ($Ta_2O_5$), cerium oxide ($CeO_2$) or a silane coupling agent (3-mercaptopropyltriethoxysilane) is used as the covering portion, the reverse reaction preventing effect on the surface of Au particles can be obtained. It was confirmed that the reverse reaction preventing rate of the photocatalytic members 38 and 40 are particularly high, and thus, that when zirconium oxide ($ZrO_2$) is used as a material of the covering portion, a high reverse reaction preventing rate can be obtained. It was further confirmed that the photocatalytic members 36 and 39 have a higher oxygen generation rate under reduced pressure than the photocatalytic member 45, and originally have an excellent oxygen generation performance. Since reverse reaction is unlikely to occur under reduced pressure, a high oxygen generation rate under reduced pressure is considered to suggest that the photocatalytic members originally have an excellent oxygen generation performance, which is of great value. In view of the above, it was confirmed that when diiron trioxide ($Fe_2O_3$) and zirconium oxide ($ZrO_2$) are used as materials of the covering portion, a high reverse reaction preventing effect can be obtained, and therefore, a high hydrogen generation performance can be obtained.

Figure 28:
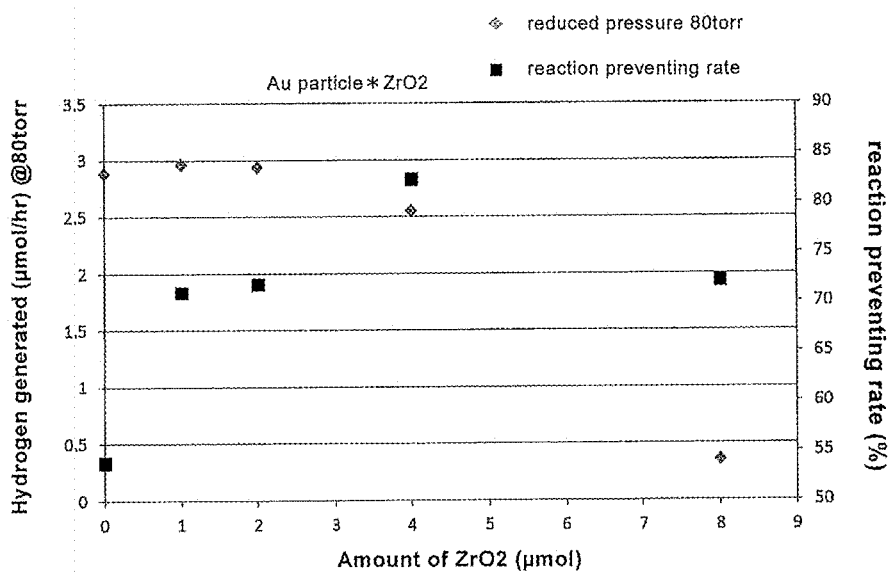
FIG. 28 is a diagram showing the relationship between amount of $ZrO_2$ and reverse reaction preventing rate based on hydrogen generation rate, in the photocatalytic members 38-41, and 46.

The relationship between amount of zirconium oxide and hydrogen generation activity or reverse reaction preventing rate based on hydrogen generation rate The hydrogen generation rate (μmol/hr) under reduced pressure (80 torr) and the reverse reaction preventing rate (%) of the photocatalytic members 38-41 having different amounts of zirconium oxide as a material of the covering portion, namely, having different thicknesses of the covering portion, as well as the photocatalytic member 45 having no covering portion are shown in FIG. 28. FIG. 28 indicates the photocatalytic member 45 having no covering portion and the photocatalytic members 38-41 each having the thickness of the covering portion (zirconium oxide) equal to 1, 2, 4 and 8 nm, in this order from the left.

The photocatalytic member 45 having no covering portion had, as also shown in Table 3, an oxygen generation amount under reduced pressure of 2.88 μmol/hr, whereas had a reverse reaction preventing rate of as low as 54%.

In contrast, in the photocatalytic members 38-41 containing Au colloid particles as the conductive particles and having different thicknesses of the zirconium oxide covering portion, when the thickness of the covering portion was 4 nm or less, hydrogen generation rate under reduced pressure was not much decreased, whereas when the thickness was as long as 8 nm, hydrogen generation rate was much decreased. Moreover, when the thickness of the covering portion was 4 nm or less, the reverse reaction preventing rate was increased depending on the thickness. On the other hand, when the thickness of the covering portion was as long as 8 nm, the reverse reaction preventing rate was decreased. In view of the above, when the covering portion is formed of a metal monomer, the thickness thereof was confirmed to be preferably less than 10 nm.

Figure 29:
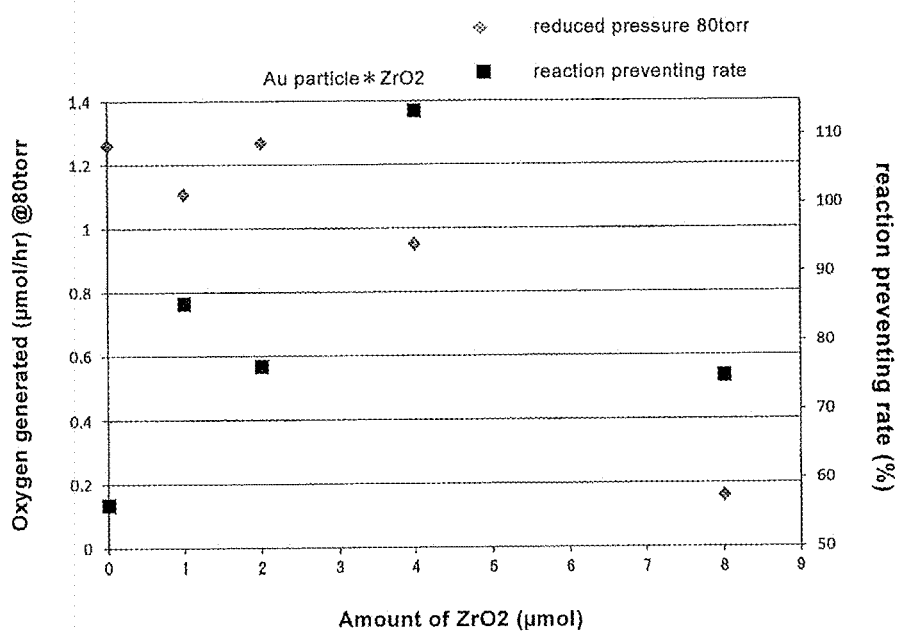
FIG. 29 is a diagram showing the relationship between amount of $ZrO_2$ and reverse reaction preventing rate based on oxygen generation rate, in the photocatalytic members 38-41, and 46.

The relationship between amount of zirconium oxide and oxygen generation activity or reverse reaction preventing rate based on oxygen generation rate The oxygen generation rate (μmol/hr) under reduced pressure (80 torr) and the reverse reaction preventing rate (%) of the photocatalytic members 38-41 having different amounts of zirconium oxide as a material of the covering portion, namely, having different thicknesses of the covering portion, as well as the photocatalytic member 45 having no covering portion are shown in FIG. 29. FIG. 29 indicates the photocatalytic member 45 having no covering portion and the photocatalytic members 38-41 each having the thickness of the covering portion (zirconium oxide) equal to 1, 2, 4 and 8 nm, in this order from the left.

The photocatalytic member 45 having no covering portion had, as also shown in Table 3, an oxygen generation amount under reduced pressure of 1.26 μmol/hr, whereas had a reverse reaction preventing rate of as low as 56%.

In contrast, in the photocatalytic members 38-41 containing Au colloid particles as the conductive particles and having different thicknesses of the zirconium oxide covering portion, when the thickness of the covering portion was 4 nm or less, oxygen generation rate under reduced pressure was not much decreased, whereas when the thickness was as long as 8 nm, oxygen generation rate was much decreased. Moreover, when the thickness of the covering portion was 4 nm or less, the reverse reaction preventing rate was generally increased depending on the thickness. On the other hand, when the thickness of the covering portion was as long as 8 nm, the reverse reaction preventing rate was decreased. In view of the above, when the covering portion is formed of a metal monomer, the thickness thereof was confirmed to be preferably less than 10 nm.

TABLE 2

| | Paste | | | | | | | Photocatalytic member (PM) | | | | | | |
|---|---|---|---|---|---|---|---|---|---|---|---|---|---|---|
| | First photocatalyst particles | | Second photocatalyst particles | | Conductive particles | | | | | Firing | Form of conductive particle | | Hydrogen generation rate | Oxygen generation rate | Absolute water-splitting | Light |
| | Type | Content (wt %) | Type | Content (wt %) | Type | Content (wt %) | | Thickness (μm) | temperature (°C.) | particle diameter | Schematic diagram | (μmol/hr) | (μmol/hr) | activity | source |
| Paste 1 | 1-1 | 40 | 2-1 BiVO₄ supporting CoOx (average primary particle diameter: 500 nm) | 40 | 1_Au | 20 | PM 1 | 10 | 300 | 20 | FIG. 1 | 0.23 | 0.11 | ○ | Xe(>420 nm) |
| Paste 2 | 3% Rh-doped SrTiO₃ | 30 | | 30 | 1_Au | 40 | PM 2 | 10 | 300 | 20 | FIG. 1 | 0.23 | 0.12 | ○ | Xe(>420 nm) |
| Paste 3 | (average primary particle diameter: 500 nm) | 40 | | 40 | 2_ITO | 20 | PM 3 | 10 | 400 | 10 | FIG. 1 | 1.80 | 0.90 | ○ | Xe(>420 nm) |
| Paste 4 | | 50 | | 50 | None | 0 | PM 4 | 10 | 300 | — | — | 0.09 | — | × | Xe(>420 nm) |
| Paste 5 | | 47.5 | 2-2 0.5% Mo-doped BiVO₄ supporting CoOx (average primary particle diameter: 500 nm) | 47.5 | 1_Au | 5 | PM 5 | 10 | 300 | 20 | FIG. 1 | 0.30 | 0.20 | ○ | Xe(>420 nm) |
| Paste 6 | | 45 | | 45 | 1_Au | 10 | PM 6 | 10 | 300 | 20 | FIG. 1 | 1.03 | 1.87 | ○ | Xe(>420 nm) |
| Paste 7 | | 40 | | 40 | 1_Au | 20 | PM 7 | 10 | 300 | 20 | FIG. 1 | 5.24 | 2.78 | ○ | Xe(>420 nm) |
| Paste 8 | | 25 | | 25 | 1_Au | 50 | PM 8 | 10 | 300 | 200 | FIG. 1 | 3.24 | 1.93 | ○ | Xe(>420 nm) |
| Paste 9 | | 47.5 | | 47.5 | 2_ITO | 5 | PM 9 | 10 | 400 | 10 | FIG. 1 | 0.53 | 0.30 | ○ | Xe(>420 nm) |
| Paste 10 | | 45 | | 45 | 2_ITO | 10 | PM 10 | 10 | 400 | 10 | FIG. 1 | 2.46 | 1.60 | ○ | Xe(>420 nm) |
| Paste 11 | | 40 | | 40 | 2_ITO | 20 | PM 11 | 10 | 400 | 10 | FIG. 1 | 3.29 | 1.68 | ○ | Xe(>420 nm) |
| Paste 12 | | 25 | | 25 | 2_ITO | 50 | PM 12 | 10 | 400 | 10 | FIG. 1 | 3.00 | 1.62 | ○ | Xe(>420 nm) |
| Paste 13 | | 50 | | 50 | None | 0 | PM 13 | 10 | 300 | — | — | 0.12 | — | × | Xe(>420 nm) |
| Paste 14 | | 47.5 | 2-3 0.05% Mo-doped BiVO₄ (average primary particle diameter: 800 nm) | 47.5 | 2_ITO | 5 | PM 14 | 10 | 400 | 10 | FIG. 1 | 2.26 | 1.30 | ○ | Xe(>420 nm) |
| Paste 15 | | 45 | | 45 | 2_ITO | 10 | PM 15 | 10 | 400 | 10 | FIG. 1 | 2.04 | 1.03 | ○ | Xe(>420 nm) |
| Paste 16 | | 40 | | 40 | 2_ITO | 20 | PM 16 | 10 | 400 | 10 | FIG. 1 | 1.53 | 0.97 | ○ | Xe(>420 nm) |
| Paste 17 | | 30 | | 30 | 2_ITO | 40 | PM 17 | 10 | 400 | 10 | FIG. 1 | 1.01 | 0.63 | ○ | Xe(>420 nm) |
| Paste 31 | | 47.5 | | 47.5 | 4_C | 5 | PM 33 | 10 | 300 | 10 | FIG. 1 | 0.75 | 0.33 | ○ | Xe(>420 nm) |
| Paste 18 | | 50 | | 50 | None | 0 | PM 18 | 10 | 300 | — | — | 0.20 | — | × | Xe(>420 nm) |
| Paste 19 | 1-2 | 45 | | 45 | 1_Au | 10 | PM 19 | 10 | 300 | 20 | FIG. 1 | 3.16 | 1.49 | ○ | Xe(>420 nm) |
| Paste 20 | 4% La and 4% Rh-doped SrTiO₃ | 40 | | 40 | 1_Au | 20 | PM 20 | 10 | 300 | 20 | FIG. 1 | 7.49 | 2.84 | ○ | Xe(>420 nm) |
| Paste 21 | | 35 | | 35 | 1_Au | 30 | PM 21 | 10 | 400 | 50 | FIG. 9 | 13.35 | 6.42 | ○ | Xe(>420 nm) |
| Paste 22 | (average primary particle diameter: 300 nm) | 30 | | 30 | 1_Au | 40 | PM 22 | 10 | 300 | 100 | FIG. 9 | 15.38 | 6.98 | ○ | Xe(>420 nm) |
| Paste 23 | | 25 | | 25 | 1_Au | 50 | PM 23 | 10 | 300 | 200 | FIG. 9 | 13.59 | 6.95 | ○ | Xe(>420 nm) |
| Paste 24 | | 45 | | 45 | 2_ITO | 10 | PM 24 | 10 | 300 | 10 | FIG. 1 | 4.17 | 1.86 | ○ | Xe(>420 nm) |
| Paste 25 | | 45 | | 45 | 1_Au | 10 | PM 25 | 10 | 400 | 40 | FIG. 10 | 2.58 | 1.36 | ○ | Xe(>420 nm) |
| Paste 26 | | 45 | | 45 | 1_Au | 10 | PM 26 | 10 | 400 | 20 | FIG. 1 | 2.50 | 1.26 | ○ | Xe(>420 nm) |
| Paste 27 | | 40 | | 40 | 1_Au | 20 | PM 27 | 10 | 400 | 20 | FIG. 1 | 2.83 | 1.36 | ○ | Xe(>420 nm) |
| Paste 28 | | 35 | | 35 | 1_Au | 30 | PM 28 | 10 | 400 | 50 | FIG. 9 | 2.80 | 1.30 | ○ | Xe(>420 nm) |
| Paste 29 | | 30 | | 30 | 1_Au | 40 | PM 29 | 10 | 300 | 100 | FIG. 9 | 10.00 | 4.90 | ○ | AM1.5G |
| Paste 30 | | 50 | | 50 | None | 0 | PM 30 | 10 | 300 | — | — | 0.05 | 0.04 | × | Xe(>420 nm) |
| Paste 18 | 1-1 | 50 | | 50 | 1_Au | ✕2 | PM 31 | 10 | 300 | 20 | FIG. 1 | 3.40 | 2.70 | ○ | Xe(>420 nm) |
| Paste 18 | 3% Rh-doped SrTiO₃ | 50 | | 50 | 1_Au | ✕100 | PM 32 | 10 | 300 | 200 | FIG. 9 | 0.55 | 0.24 | ○ | Xe(>420 nm) |
| Paste 32 | 1-1 | 40 | | 40 | 2_ITO | 20 | PM 34 | 10 | 300 | 10 | FIG. 1 | 0.33 | 0.10 | ○ | Xe(>420 nm) |
| Paste 33 | 3% Rh-doped SrTiO₃ (average primary particle diameter: 500 nm) | 50 | 2-4 Ta₃N₅ (average primary particle diameter: 300 nm) | 50 | None | 0 | PM 35 | 10 | 300 | — | — | — | — | × | Xe(>420 nm) |

TABLE 3

| | First photocatalyst particles | Second photocatalyst particles | Conductive particles | Covering portion | | | |
|---|---|---|---|---|---|---|---|
| | | | | Material | Content | Thickness (nm) | Type |
| PM 36 | 1-1 | 2-3 | 1_Au | Fe$_2$O$_3$ | 0.4 mg | 10 | FIG. 3 |
| PM 37 | | | | CeO$_2$ | 0.4 mg | 8 | FIG. 3 |
| PM 38 | | | | ZrO$_2$ | 1 umol | 1 | FIG. 4 |
| PM 39 | | | | ZrO$_2$ | 2 umol | 2 | FIG. 4 |
| PM 40 | | | | ZrO$_2$ | 4 umol | 4 | FIG. 4 |
| PM 41 | | | | ZrO$_2$ | 8 umol | 8 | FIG. 4 |
| PM 42 | | | | SiO$_2$ | 2 umol | 2 | FIG. 4 |
| PM 43 | | | | Ta$_2$O$_5$ | 2 umol | 2 | FIG. 4 |
| PM 44 | | | | silane coupling agent | 0.5 umol | 0.5 | FIG. 5 |
| PM 45 | | | | none | — | — | — |
| PM 46 | | | 2_ITO | ZrO2 | 2 umol | 2 | — |
| PM 47 | | | | none | — | — | — |
| PM 48 | | | 4_C | ZrO2 | 2 umol | 2 | — |
| PM 49 | | | | none | — | — | — |

| | Water-splitting ability | | | | | |
|---|---|---|---|---|---|---|
| | H2 ↑ μmol/hr | | Reverse reaction preventing rate (%) | O2 ↑ μmol/hr | | Reverse reaction preventing rate (%) |
| | Reduced pressure 80 torr | Half normal pressure 380 torr | H2(half normal pressure)/H2(reduced pressure) × 100 | Reduced pressure 80 torr | Half normal pressure 380 torr | O2(half normal pressure)/O2(reduced pressure) × 100 |
| PM 36 | 2.88 | 1.92 | 67 | 1.27 | 0.89 | 70 |
| PM 37 | 2.07 | 1.53 | 74 | 0.93 | 0.67 | 72 |
| PM 38 | 2.96 | 2.1 | 71 | 1.11 | 0.95 | 86 |
| PM 39 | 2.94 | 2.11 | 72 | 1.27 | 0.97 | 76 |
| PM 40 | 2.55 | 2.1 | 82 | 0.95 | 1.08 | 114 |
| PM 41 | 0.36 | 0.26 | 72 | 0.16 | 0.12 | 75 |
| PM 42 | 1.81 | 1.29 | 71 | 0.75 | 0.55 | 73 |
| PM 43 | 1.66 | 1.23 | 74 | 0.71 | 0.55 | 77 |
| PM 44 | 2.8 | 2.13 | 76 | 1.3 | 1.11 | 85 |
| PM 45 | 2.88 | 1.55 | 54 | 1.26 | 0.71 | 56 |
| PM 46 | 1.55 | 1.4 | 90 | 0.72 | 0.63 | 88 |
| PM 47 | 1.67 | 1.6 | 96 | 0.81 | 0.78 | 96 |
| PM 48 | 0.78 | 0.76 | 97 | 0.34 | 0.3 | 88 |
| PM 49 | 0.8 | 0.78 | 98 | 0.38 | 0.36 | 95 |

DESCRIPTION OF REFERENCE CHARACTERS

10: visible light responsive photocatalyst particle for hydrogen generation (first photocatalyst particle)
20: visible light responsive photocatalyst particle for oxygen generation (second photocatalyst particle)
40: conductive particle
50: conductive wire
60: covering portion
61: colloid particle
62, 63: reverse reaction preventing layer
70: photocatalytic layer
71: pore
80: intermediate layer
90: base
100-105, 110, 120, 130: photocatalytic member

What is claimed is:

1. A photocatalytic member comprising a base and a photocatalytic layer fixed on the base, wherein the photocatalytic layer comprises
first photocatalyst particles being visible light responsive photocatalyst particles for hydrogen generation,
second photocatalyst particles being visible light responsive photocatalyst particles for oxygen generation, and
conductive particles which are provided between the first photocatalyst particle and the second photocatalyst particle, have Fermi level at a negative position relative to an electronic energy level at the upper end of the valence band of the first photocatalyst particle and at a positive position relative to an electronic energy level at the bottom end of the conduction band of the second photocatalyst particle, and are able to store an electron and a hole, and
wherein the conductive particles are located to be coupled to both the first photocatalyst particles and the second photocatalyst particles.

2. The photocatalytic member according to claim 1, wherein
the conductive particle has a first region, a second region and a third region on a surface thereof; and
is in contact with the first photocatalyst particle in the first region,
is in contact with the second photocatalyst particle in the second region, and
is not in contact with either of the first or the second photocatalyst particles in the third region.

3. The photocatalytic member according to claim 1, wherein the conductive particle has a conductivity of 0.1 Scm$^{-1}$ or more.

4. The photocatalytic member according to claim 1, wherein the average primary particle diameter of the conductive particles is smaller than the average primary particle diameter of the first photocatalyst particles, and is smaller than the average primary particle diameter of the second photocatalyst particles.

5. The photocatalytic member according to claim 1, wherein the average primary particle diameter of the conductive particles is 10 nm or more to 200 nm or less.

6. The photocatalytic member according to claim 1, wherein the content of the conductive particles is 5 wt % or more to 50 wt % or less based on the total content of the first photocatalyst particles, the second photocatalyst particles and the conductive particles.

7. The photocatalytic member according to claim 1, wherein the conductive particle comprises as a material a conductive metal oxide.

8. The photocatalytic member according to claim 7, wherein the conductive metal oxide comprises tin-doped indium oxide (ITO).

9. The photocatalytic member according to claim 1, wherein the conductive particle comprises as a material a metal.

10. The photocatalytic member according to claim 9, wherein the metal comprises gold.

11. The photocatalytic member according to claim 1, wherein the conductive particle comprises as a material a carbon material.

12. The photocatalytic member according to claim 11, wherein the carbon material comprises one or more selected from the group consisting of carbon black, Ketjen black, acetylene black, channel black, furnace black, thermal black, and lamp black.

13. The photocatalytic member according to claim 2, wherein the photocatalytic layer further comprises a covering portion that covers at least a part of the third region of the conductive particle.

14. The photocatalytic member according to claim 13, wherein the covering portion comprises one oxide selected from the group consisting of iron, silicon, zirconium, tantalum and cerium.

15. The photocatalytic member according to claim 14, wherein the covering portion comprises one or more selected from the group consisting of diiron trioxide and zirconium oxide.

16. The photocatalytic member according to claim 13, wherein the thickness of the covering portion is 0.5 nm or more to 50 nm or less.

17. The photocatalytic member according to claim 1, further comprising an intermediate layer provided between the base and the photocatalytic layer.

18. The photocatalytic member according to claim 1, wherein a co-catalyst is supported on a surface of the first photocatalyst particle and/or the second photocatalyst particle.

19. The photocatalytic member according to claim 18, wherein the average primary particle diameter of the co-catalyst is less than 10 nm.

20. A method for producing a photocatalytic member according to claim 1 which comprises the base and the photocatalytic layer fixed thereon, the method comprising the steps of:

applying on the base a dispersion obtained by wetly dispersing into a solvent the first photocatalyst particles, the second photocatalyst particles, and the conductive particles which have Fermi level at a negative position relative to an electronic energy level at the upper end of the valence band of the first photocatalyst particle and at a positive position relative to an electronic energy level at the bottom end of the conduction band of the second photocatalyst particle, and are able to store an electron and a hole; and drying the dispersion applied on the base.

* * * * *